(12) United States Patent
Aoki et al.

(10) Patent No.: US 8,577,721 B2
(45) Date of Patent: Nov. 5, 2013

(54) COMMUNICATION DEVICE AND NETWORK COMMUNICATION SYSTEM

(75) Inventors: Kazuma Aoki, Kasugai (JP); Kiyotaka Ohara, Nagoya (JP); Makoto Matsuda, North Brunswick, NJ (US)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1367 days.

(21) Appl. No.: 11/472,444

(22) Filed: Jun. 22, 2006

(65) Prior Publication Data

US 2007/0071193 A1  Mar. 29, 2007

(30) Foreign Application Priority Data

Jun. 22, 2005  (JP) .................................. 2005-182110

(51) Int. Cl.
| | |
|---|---|
| G06Q 30/02 | (2012.01) |
| G06Q 30/00 | (2012.01) |
| G06F 15/173 | (2006.01) |
| H04L 12/66 | (2006.01) |
| H04W 4/16 | (2009.01) |

(52) U.S. Cl.
USPC .......... 705/14.1; 370/352; 370/259; 709/227; 455/414.1; 379/201.05; 705/14.39; 705/14.29

(58) Field of Classification Search
USPC ............. 370/352, 310, 338, 259; 379/114.13, 379/142.01, 201.01, 218.01, 142.15, 379/221.06, 201.05; 709/227–229; 455/414.1, 403, 556.1–556.2, 550.1, 455/557, 566; 705/14.1–14.73
See application file for complete search history.

(56) References Cited

U.S. PATENT DOCUMENTS

| | | | | | |
|---|---|---|---|---|---|
| 6,009,410 | A | * | 12/1999 | LeMole et al. | ............. 705/14.54 |
| 6,332,127 | B1 | * | 12/2001 | Bandera et al. | ............ 705/14.55 |
| 7,027,801 | B1 | * | 4/2006 | Hall et al. | .................. 455/412.1 |
| 7,460,652 | B2 | * | 12/2008 | Chang | ........................ 379/88.18 |
| 7,979,308 | B2 | * | 7/2011 | Ho et al. | ....................... 705/14.7 |
| 2001/0056479 | A1 | | 12/2001 | Miyayama et al. | |
| 2003/0032409 | A1 | * | 2/2003 | Hutcheson et al. | ........... 455/414 |
| 2004/0030598 | A1 | * | 2/2004 | Boal | .............................. 705/14 |
| 2004/0062374 | A1 | | 4/2004 | Lund | |

(Continued)

FOREIGN PATENT DOCUMENTS

| | | |
|---|---|---|
| JP | H944581 | 2/1997 |
| JP | 2001-022539 A | 1/2001 |

(Continued)

OTHER PUBLICATIONS

European Patent Office, European Search Report for Related EP Application No. 06253198 dated Oct. 30, 2006.

(Continued)

*Primary Examiner* — Asad Nawaz
*Assistant Examiner* — Wutchung Chu
(74) *Attorney, Agent, or Firm* — Baker Botts L.L.P.

(57) ABSTRACT

There is provided a communication device which has a first communication system that communicates with an external telephone device and a second communication system that communicates with an external computer. The communication device comprises a call unit and a data acquisition unit. The call unit makes a call to a telephone device designated by a user using the first communication system. If a destination of the call unit is decided by the user's designation, a data acquisition unit obtains data corresponding to the destination telephone device using the second communication system. By only making a call operation, the user can obtain the data corresponding to the destination telephone device from the communication device through the computer network which is a different kind of network from the telephone line network. That is, the communication device can reduce user's operations to access related devices over various kinds of networks.

30 Claims, 12 Drawing Sheets

(56) References Cited

U.S. PATENT DOCUMENTS

| | | | |
|---|---|---|---|
| 2004/0148229 A1* | 7/2004 | Maxwell | 705/26 |
| 2004/0224705 A1* | 11/2004 | Nishimura | 455/466 |
| 2005/0049008 A1* | 3/2005 | Muto | 455/566 |
| 2005/0129193 A1 | 6/2005 | Watts et al. | |
| 2005/0177416 A1* | 8/2005 | Linden | 705/14 |
| 2005/0239448 A1* | 10/2005 | Bayne | 455/414.3 |
| 2006/0293065 A1* | 12/2006 | Chew et al. | 455/456.3 |
| 2007/0162341 A1* | 7/2007 | McConnell et al. | 705/14 |
| 2007/0210155 A1* | 9/2007 | Swartz et al. | 235/383 |
| 2007/0258570 A1* | 11/2007 | Selenius et al. | 379/201.02 |
| 2008/0057920 A1* | 3/2008 | Pettit et al. | 455/414.1 |
| 2009/0138352 A1* | 5/2009 | Kanno | 705/14 |
| 2009/0298480 A1* | 12/2009 | Khambete et al. | 455/414.1 |

FOREIGN PATENT DOCUMENTS

| | | |
|---|---|---|
| JP | 200122539 | 1/2001 |
| JP | 2002-024665 A | 1/2002 |
| JP | 2002-044146 A | 2/2002 |
| JP | 2002-044256 A | 2/2002 |
| JP | 2002-158696 A | 5/2002 |
| JP | 2003-044498 A | 2/2003 |
| JP | 2003-271493 A | 9/2003 |
| JP | 2006-211135 A | 8/2006 |
| WO | 98/35481 A2 | 8/1998 |

OTHER PUBLICATIONS

Shojima et al., "A Method for Mediator Identification Using Queued History for Encrypted User Information in an Incentive Attached peer to peer Electronic Coupon System," 2004 IEEE International Conference on Systems, Man, and Cybernetics, The Hague, The Netherlands, Oct. 10-13, 2004, vol. 1, pp. 1086-1091.

Japan Patent Office; Notification of Reasons of Rejection in Japanese Patent Application No. 2005-182110 (counterpart to the above-captioned U.S. patent application) mailed Apr. 6, 2010.

* cited by examiner

FIG.3A

| ADVERTISEMENT DATA | |
|---|---|
| SHOP NAME | URL OF SHOP DATA |
| SHOP NAME | URL OF SHOP DATA |
| SHOP NAME | URL OF SHOP DATA |

SHOP NAME

| SHOP NAME |
|---|
| SHOP INTRODUCTION |
| URL OF TELEPHONE NUMBER (INCLUDING SHOP CODE) |
| URL OF COUPON DATA |
| URL OF DETAILED INFORMATION |

| DESTINATION DATA | |
|---|---|
| SHOP CODE | TELEPHONE NAME |
| SHOP CODE | TELEPHONE NAME |
| SHOP CODE | TELEPHONE NAME |

| INQUIRY RECORD DATA | |
|---|---|
| SHOP CODE | INQUIRY COUNT |
| SHOP CODE | INQUIRY COUNT |
| SHOP CODE | INQUIRY COUNT |

⋮

```
<data type=list_data>
<shop name=PUB HOUSE AAA>
<URL>http://{(ADVERTISEMENT SERVER)/(SHOP DATA NAME)}</URL>
</shop>
<shop name=ITALIAN RESTAURANT BBB>
<URL>http://{(ADVERTISEMENT SERVER)/(SHOP DATA NAME)}</URL>
</shop>
  ......
</data>
```

FIG.4A

```
<data type=shop_data>
<shop name=ITALIAN RESTAURANT BBB>
<introduction>......</introduction>
<phone_URL>http://{(ADVERTISEMENT SERVER ADDRESS)/(INQUIRY PROGRAM NAME)}?command=ID0000</phone_URL>
<coupon_URL>http://{(INQUIRY PROGRAM NAME)}?command=coupon</coupon_URL>
<detail_URL>http://{(SHOP SERVER ADDRESS)/(INQUIRY PROGRAM NAME)}?command=detail</detail_URL>
</data>
```

COMMUNICATION DEVICE AND NETWORK COMMUNICATION SYSTEM

CROSS REFERENCE TO RELATED APPLICATION

This application claims priority under 35 U.S.C. §119 from Japanese Patent Application No. 2005-182110, filed on Jun. 22, 2005. The entire subject matter of the application is incorporated herein by reference.

BACKGROUND

1. Technical Field

Aspect of the invention relate to a communication device which is communicatable with an external telephone device via a telephone line network and also communicatable with an external computer via a computer network, a network communication system which includes the communication device, and a program which is used in the communication device.

2. Related Art

Conventionally, as communication devices, a telephone device connected to a telephone line network, a personal computer and a server device, etc. connected to a computer network such as the Internet are known. Recently, a digital multi function device (MFD) which is capable of performing voice communication and facsimile communication through a telephone line network, etc., and is also connectable to the network (e.g., the Internet), is known. An example of such an MFD is disclosed in Japanese Patent Application Provisional Publication No. P2001-22539A.

As a system using a communication device, a reservation system which can accept reservations on various services with communication between facsimile devices is known. For example, as a publicly known reservation system, a telephone reservation system is known where voice message is transmitted form a receptionist's facsimile device to a customer's facsimile device, and if a push button signal is input into the receptionist's facsimile device from the customer's facsimile device, the receptionist's facsimile device processes the push button signal and generates image data of a form for acceptance of reservation, transmits the data to the customer's facsimile device, and make the customer's facsimile device print out the form for acceptance of reservation (see Japanese Patent Application Provisional Publication No. HEI 09-44581).

As sites existing in the Internet, ones introducing shops and coupon data can be down loaded therefrom are known, By using the coupon data, a consumer can receive discount on commodities or services from corresponding shops. For example, by showing a printout of coupon data to a salesperson, or showing a displayed image of coupon data (on a display of a handy terminal, etc.) to a salesperson, the customer can receive a discount of amount of payment, etc.

However, conventionally, regarding coupon data, a consumer has to access the relevant site and download coupon data himself. That is, in some cases, a consumer may be required to do troublesome operations to obtain coupon data from a site in the Internet to an apparatus (e g., a digital multi function device) in addition to an operation to make a telephone call for reservation (through the telephone network).

SUMMARY

Aspects of the invention are advantageous in that there is provided a network communication system which is capable of reducing user's operations for accessing devices in different kinds of networks (e.g., telephone line network and computer network).

BRIEF DESCRIPTION OF THE ACCOMPANYING DRAWINGS

FIG. 3 shows a configuration of advertisement data which the advertisement server retains.

FIG. 4A shows an exemplary configuration of advertisement data, and FIG. 4B shows an exemplary configuration of shop data.

Figure 5:
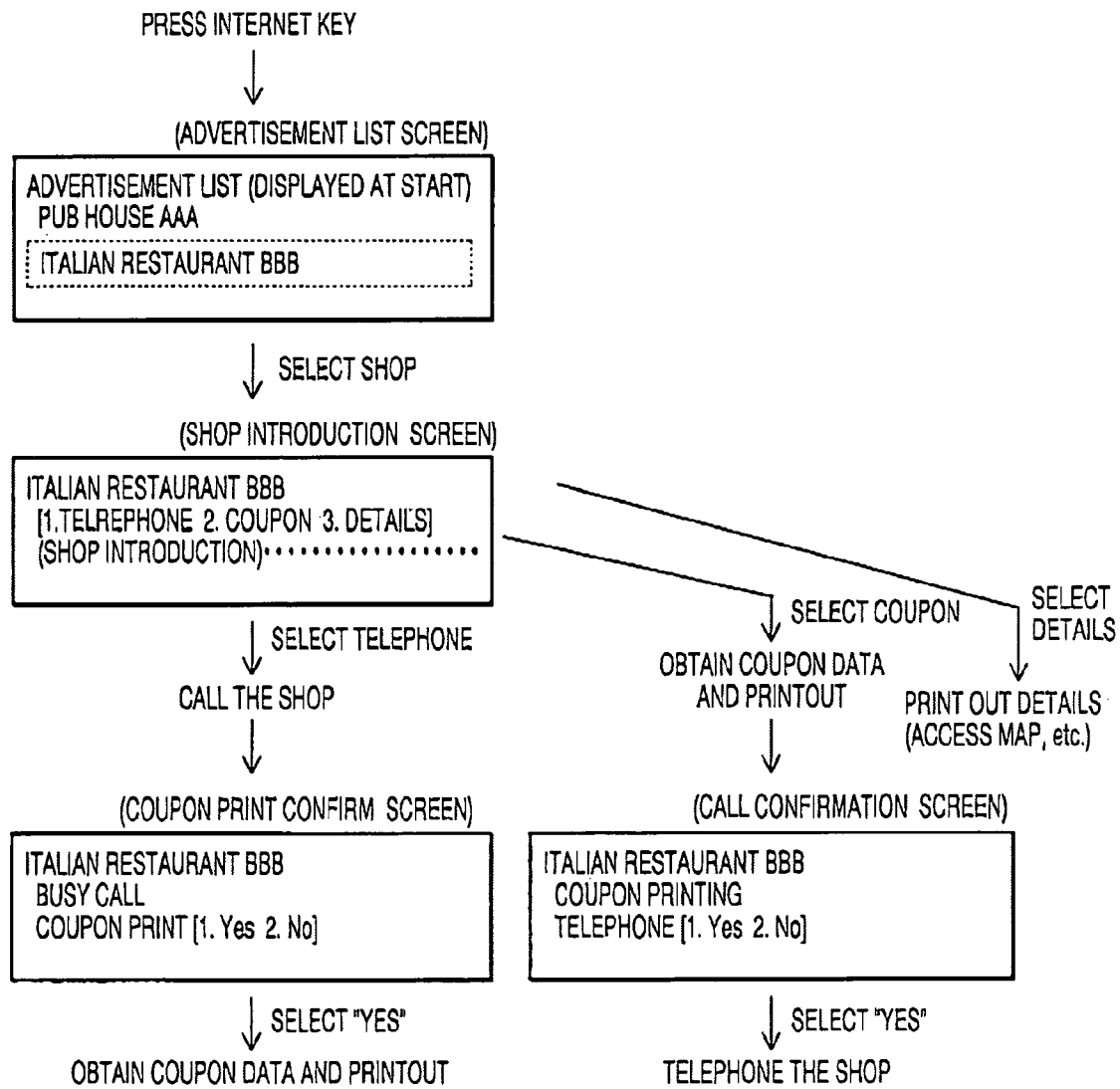

FIG. 5 schematically shows flow of a coupon providing process that the multi function device executes.

Figure 6:
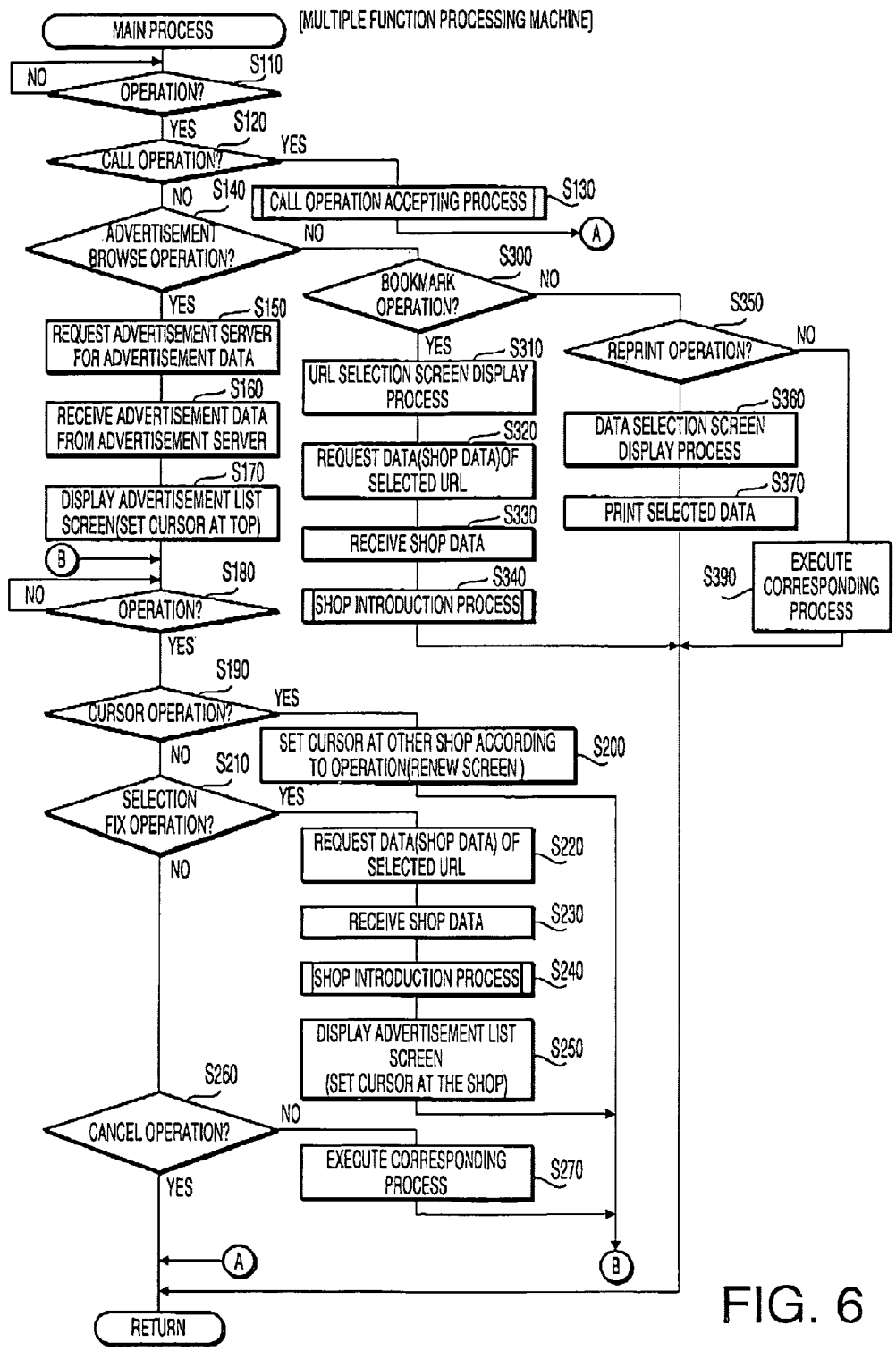

FIG. 6 is a flowchart which shows a main process that the control unit executes.

Figure 7:
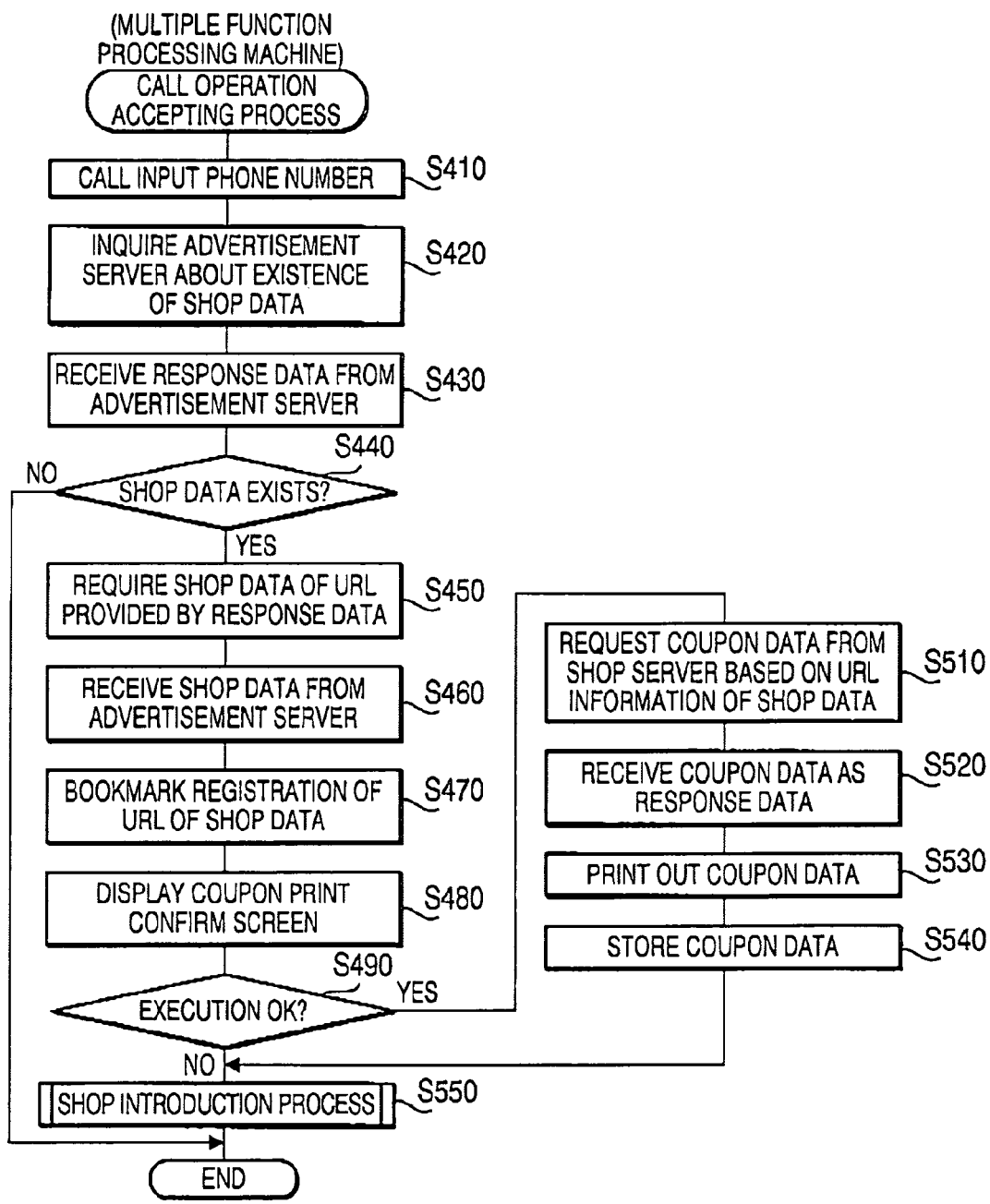

FIG. 7 is a flowchart which shows a call operation accepting process that the control unit executes.

Figure 8:
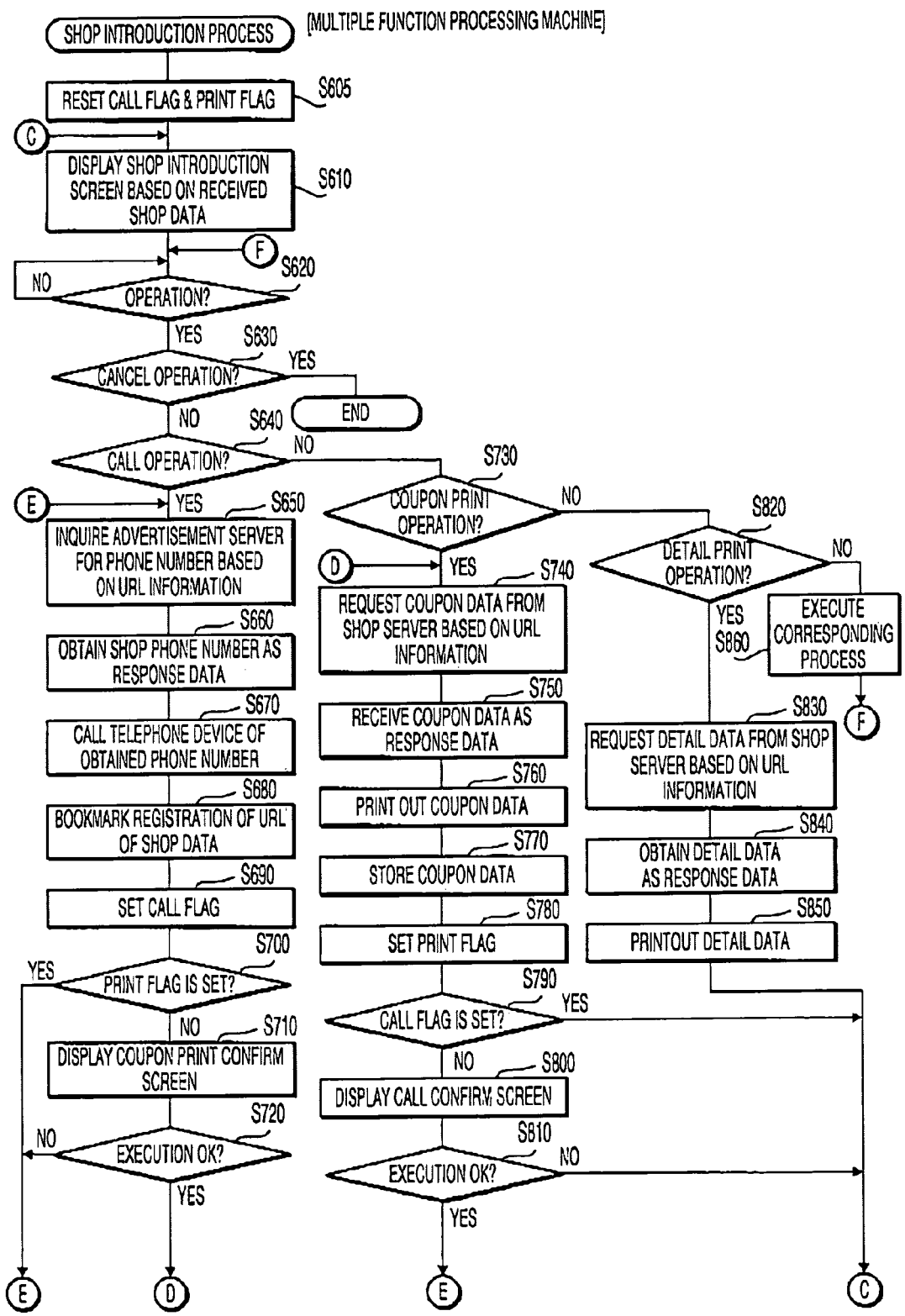

FIG. 8 is a flowchart which shows a shop introduction process executed by the control unit.

Figure 9:
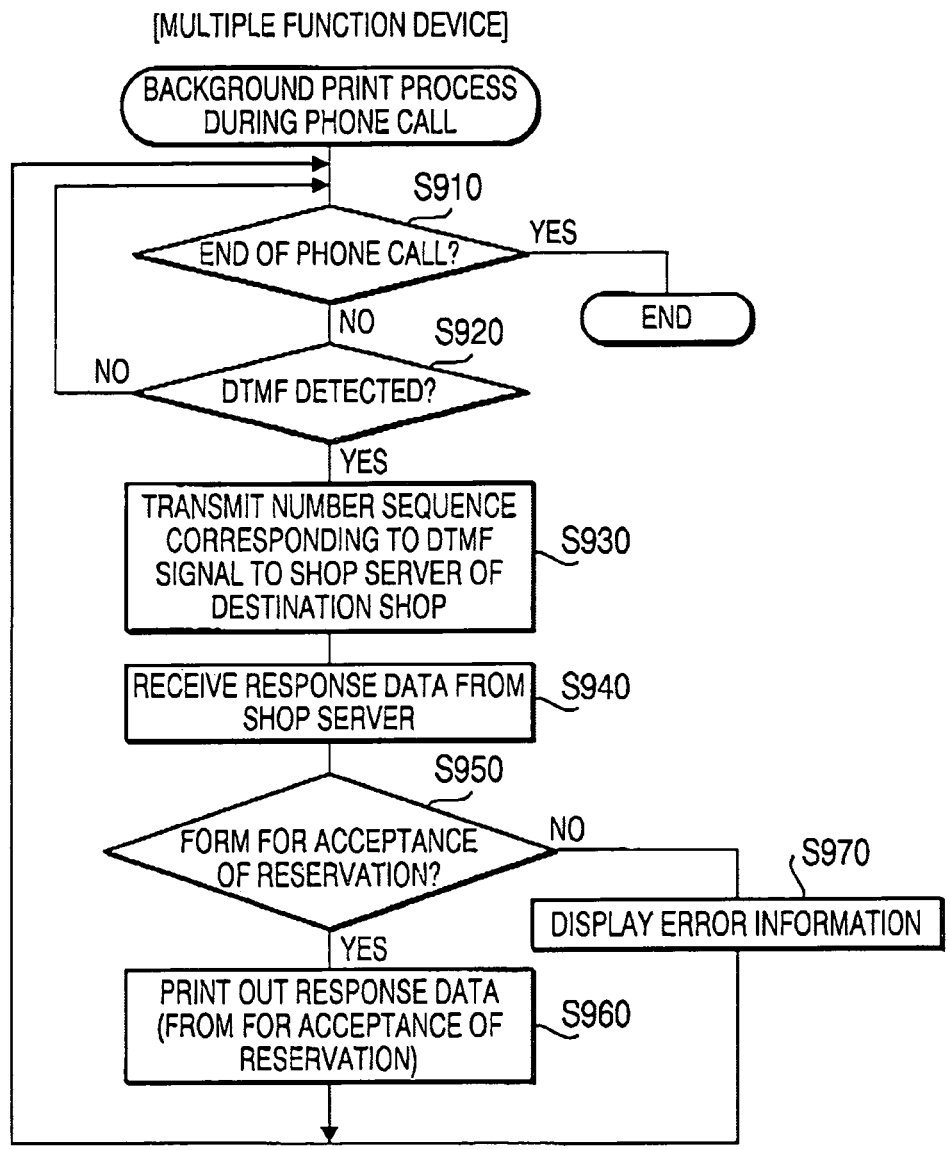

FIG. 9 is a flowchart which shows a background print process during a phone call that the control unit executes.

Figure 10:
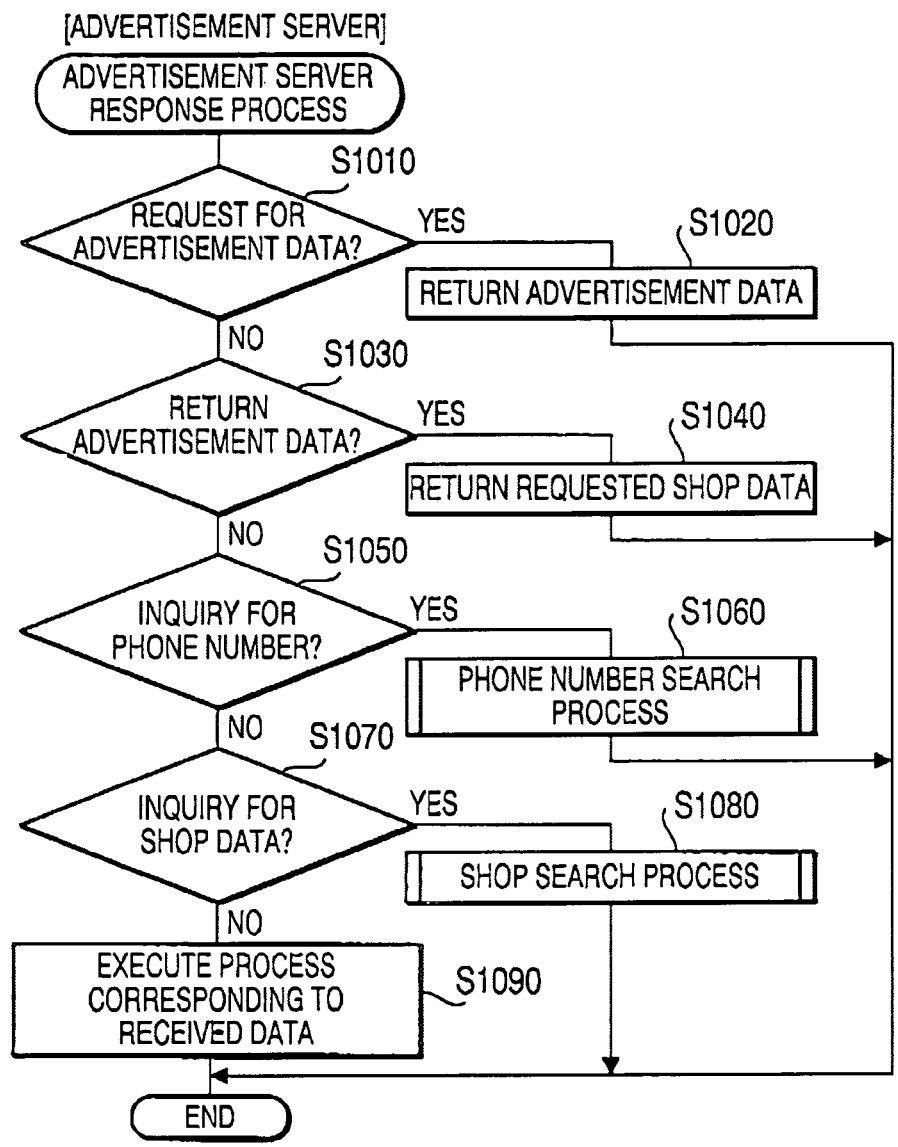

FIG. 10 is a flowchart which shows an advertisement server response process that the control unit of the advertisement server executes.

Figure 11:
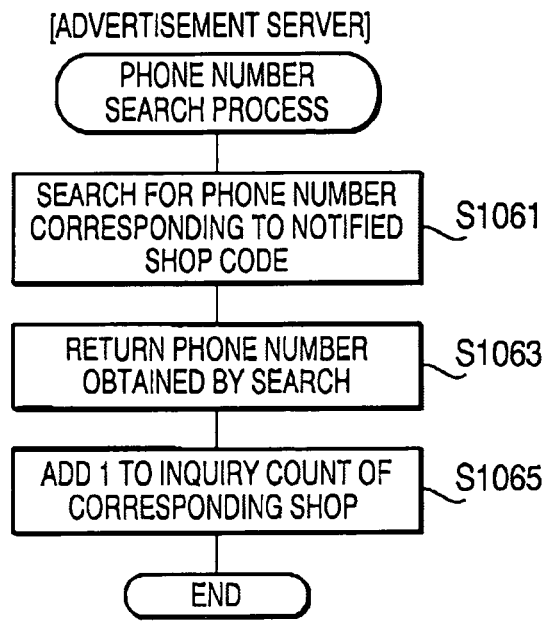

FIG. 11 is a flowchart which shows a number search process that is executed by the control unit.

Figure 12:
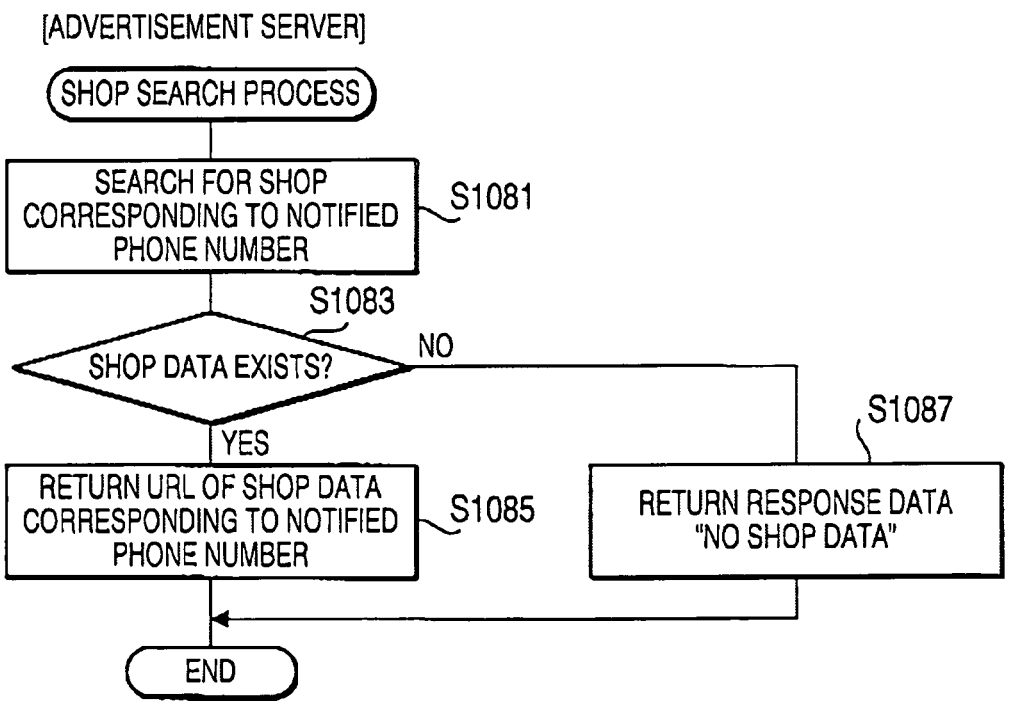

FIG. 12 is a flowchart which shows a shop search process that is executed by the control unit.

Figure 13:
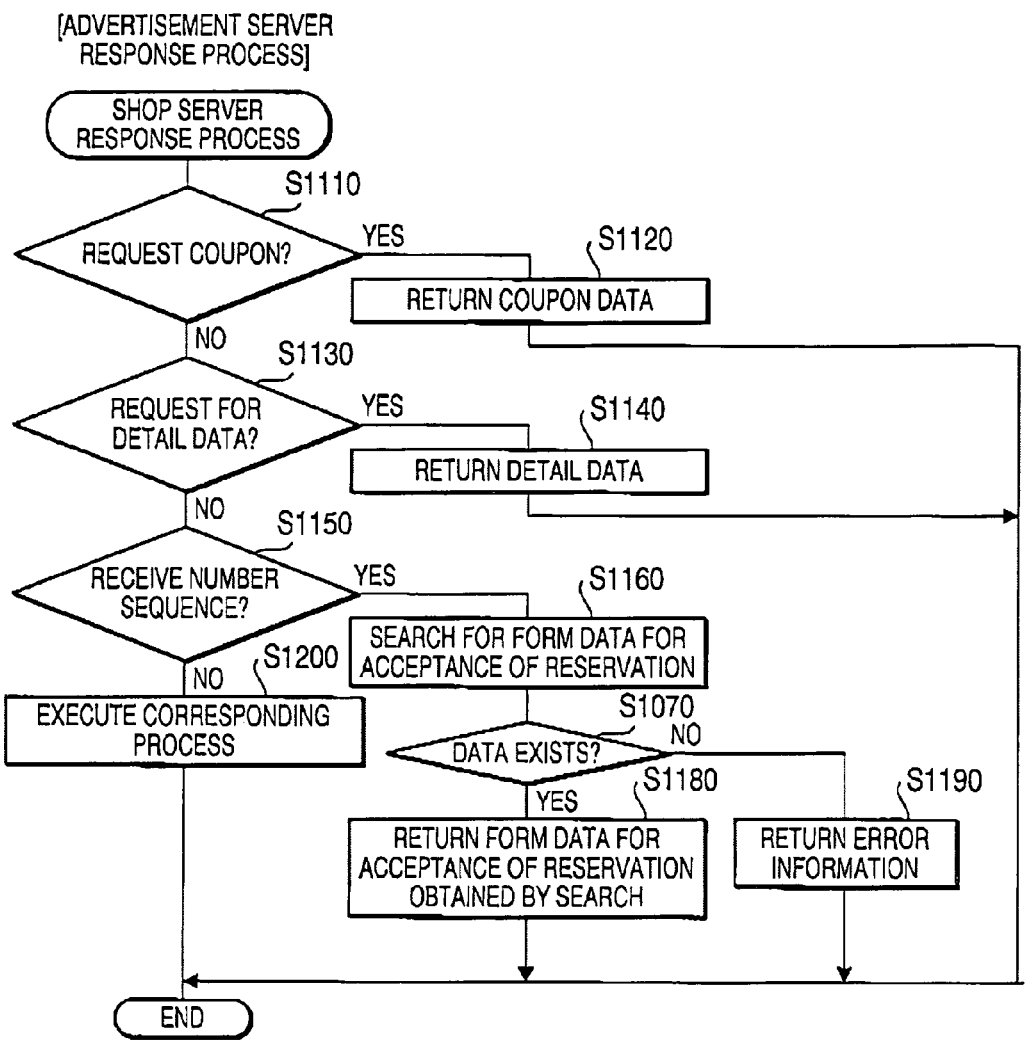

FIG. 13 is a flowchart which shows a shop server response process that is executed by a shop server.

DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to aspects of the invention, there is provided a communication device which has a first communication system that communicates with an external telephone device via a telephone line network and a second communication system that communicates with an external computer via a computer network. The communication device comprises a call unit and a data acquisition unit.

In the communication device, the call unit makes a call to a telephone device designated by a user using the first communication system based on operation information of the user input through the input device. If a destination of the call unit is decided by the user's designation, a data acquisition unit obtains data corresponding to the destination telephone device using the second communication system from a computer in the computer network. That is, according to aspects of the present invention, the data acquisition unit obtains data corresponding to the destination telephone device from the computer in the computer network using the second communication system in conjunction with the call unit.

Therefore, according to the aspects of the present invention, by only making a call operation, the user can obtain the data corresponding to the destination telephone device from the communication device through the computer network which is a different kind of network from the telephone line network. That is to say, the communication device according to aspects of the present invention can reduce user's operations to access related apparatuses over various kinds of networks (e.g., a telephone line network and a computer network).

For example, if a destination is a telephone device of a shop and data corresponding to the telephone device is coupon data, the user only has to make a telephone call to the shop for reservation, etc., to obtain the shop's coupon data. Therefore, by using the communication device according to the aspects of the present invention, a user does not have to make bothersome operations to obtain coupon data, which are required by the conventional devices.

In particular, the communication device of the present invention may be configured so that the communication device obtains the data associated with identification information of the destination telephone device from a specific computer which memories the data associated with identification information of the destination telephone device (for example, telephone number).

Optionally, a communication device may include an address information acquisition unit that obtains address information associated with identification information of the destination telephone device from database which stores address information (for example, URL (Uniform Resource Locator) information) in conjunction with the identification information of the telephone device. If a destination of a call unit is decided, the data acquisition unit of the communication device obtains data corresponding to the decided destination telephone device using the second communication system from the computer in the computer network based on the address information acquired by the address information acquisition unit. Optionally, a database may be included in the communication device, or may be installed in an external device (a computer in a computer network).

If the communication device is configured in this way, entities of the data acquired by the data acquisition unit can be managed separately from database stores the address information on the data providing side.

Optionally, a address information acquisition unit may be configured so that the unit obtains address information corresponding to the destination telephone device, if a destination of the call unit is decided by the user's designation, or may be configured so that the unit obtains address information corresponding to the telephone device which is possible to be a destination before the call unit decides a destination.

Further optionally, the communication device may be configured so that the address information acquisition unit obtains address information associated with the identification information of the telephone device which is possible to be a destination from the database based on the user's operation information input from an input device. In the communication device configured in this way according to aspects of the invention, because the address information is obtained before the destination is decided, the communication device can make the data acquisition unit obtain promptly data corresponding to the destination telephone device after the destination is decided by the call unit. Therefore, according to the invention, user's frustration due to time consuming data acquisition can be prevented.

Here, "a telephone device which is possible to be a destination" may be a telephone device which the communication device presumes based on operation information of the user input from a input device (a telephone device that a user may designate as a destination).

Optionally, a communication device may be configured so that if the destination of the call unit is decided, the address information acquisition unit obtains address information corresponding to the destination telephone device from database, and if the address information acquisition unit obtains the address information, the data acquisition unit obtains data corresponding to the decided destination telephone device from the computer in the computer network using the second communication system based on the address information.

According to the communication device, because address information is obtained after the destination is decided, necessary address information is obtained effectively, and load of address information acquisition can be reduced. For example, if address information is obtained via the computer network, network traffic can be reduced.

The communication device which obtains data corresponding to the destination telephone device from the computer network triggered by the user's call operation is described above. However, the communication device may be configured so that triggered by the user's data acquisition operation the device makes a call to the telephone device corresponding to the data acquisition.

According to another aspect of the invention, there is provided a communication device which has a first communication system that communicates with an external telephone device via a telephone line network and a second communication system that communicates with an external computer via a computer network. The communication device comprises an acquisition unit that obtains data managed by a computer in the computer network and designated by a user using the second communication system from the above computer based on operation information of the user input from a input device, and a call unit that makes a call to a telephone device corresponding to object data of the data acquisition unit using the first communication system if the object data is decided by user's designation.

In the communication device, the call unit makes a call to the telephone device corresponding to the obtained data in conjunction with the data acquisition unit, Therefore, according to the communication device, the device can reduce the user's operations to access relevant apparatuses over various kinds of networks (a telephone line network and a computer network). The user only has to make a data acquisition operation to make a call to the telephone device corresponding to the obtained data.

For example, if the communication device is configured so that when the data acquisition unit obtains coupon data, the call unit makes a call to the telephone device of a shop where coupon data is useable, then by only obtaining the coupon data, the user can talk with a salesperson over the telephone without operation of inputting telephone number of the shop, etc., and can easily make actions such as reservations.

Optionally, a communication device may be configured so that the communication device obtains data designated by the user from a specific computer which stores data corresponding to the telephone device and identification information of the telephone device associating with each other, and obtains also identification information of a telephone device corresponding to the data, and makes a call to the telephone device corresponding to the acquired data based on the identification information.

Optionally, a communication device may include a identification information acquisition unit that obtains identification information of the telephone device associated with address information of the site from which the data is obtained from database which stores address information in the computer network and identification information of the telephone device corresponding to the address associating with each other. The communication device may be configured so that if the object data of the data acquisition unit is decided by the user's designation, the call unit makes a call to the telephone device corresponding to the object data. When the communication device is configured in this way, entities of the data acquired by the data acquisition unit can be managed separately from database that stores the address information on the data providing side.

Optionally, the above described communication device may be configured so that data acquired by the data acquisition unit is stored in nonvolatile recorded medium such as NVRAM (flash memory), hard disk apparatus, etc., or may be configured so that images based on acquired data are output on a screen or record papers using a display device or a print device.

Optionally, a communication device may include a data record unit that records data acquired by the data acquisition unit in nonvolatile memory medium mounted in the communication device. According to the communication device, necessary data can be promptly provided to the user's need.

Further optionally, a communication device may include an image output unit that outputs images based on data obtained by the data acquisition unit, According to the communication device, the data can be output visually recognizably to the user. Optionally, a communication device may include an image output unit that is configured to print out images based on data obtained the data acquisition unit. According to the communication device, image can be produced on recording papers based on the obtained data so that the user may carry the data with him.

Further optionally, a database may store identification information of the telephone device of each predetermined shop and address information representing a site from which the shop data is obtained associating with each other. According to the communication device operating based on the database, the user can easily and continuously do both actions of inquiry on shops or reservation by telephone, and data acquisition of shop data such as an access map, coupon data, etc.

Further optionally, address information of a site from which shop data is obtained may be address information of a site from which coupon data representing coupon which can be used in shops is obtained. If both actions of inquiry on shops or reservation by telephone and data acquisition of coupon data can be done by simple operation and continuous operation, consumers visit the shops more frequently.

According to an aspect of the invention, there is provided a network communication system that includes a server device connected to a computer network having database that stores identification information of a telephone device and address information in a computer network representing a site from which data corresponding to the telephone device is obtained associating with each other, and the communication device in which the address information acquisition unit is configured to obtain address information from the database of the sever device using the second communication system. According to the network communication system, besides the communication device realizes the above described effect, because database is configured separately from the communication device, update of the database can be easily done.

According to another aspect of the invention, there is provided a network communication system that includes a server device that has database which stores address information in a computer network and identification information of a telephone device corresponding to the address associating with each other, and is connected to a computer network, and the communication device in which the identification information acquisition unit is configured to obtain identification information of the telephone device from the database of the sever device using the second communication system. According to the network communication system, besides the communication device realizes the above described effect, because database is configured separately from the communication device, update of the database can be easily done.

Optionally, a network communication system may be configured so that the server device includes database, as the above described database, that memories identification information of the telephone device of each predetermined shop and address information representing a site from which the shop data is obtained associating with each other. According to the network communication system, the user can easily and continuously do both actions of inquiry on shops or reservation by telephone, and data acquisition of shop data such as an access map, coupon data, etc.

Further optionally, a communication device may include a computer that is connected to a computer network and stores the shop data corresponding to the address information registered in the database. Thus, when the network communication system is configured so as to make other device to hold the shop data other than the sever device that has the database, the data can be managed distributedly and data management effort can be reduced.

Each function of each unit of the communication device described above can be realized by a computer with a program. According to an aspect of the present inventing, there is provided a program that makes a computer, which has a first communication system that communicates with an external telephone device via a telephone line network and a second communication system that communicates with an external computer via a computer network, realize functions of the call unit that makes a call to a telephone device designated by a user using a first communication system based on operation information of the user input from a input device, and a data acquisition unit that obtains data corresponding to a destination telephone device using the second communication system from a computer network in the computer network if the destination of the call unit is decided by the user's designation. According to the program, the communication device described above can be realized.

According to another aspect of the present invention, there is provided a program that makes a computer, which has a first communication system that communicates with an external telephone device via a telephone line network and a second communication system that communicates with an external computer via a computer network, realize functions of a call unit that makes a call to the telephone device designated by the user using the first communication system based on operation information of the user input from a input device, an address information acquisition unit that obtains address information associated with identification information of the destination telephone device from database that stores identification information of the telephone device and address information in the computer network representing a site from which data corresponding to the telephone device is obtained associating with each other, a data acquisition unit of the communication device that obtains data corresponding to the decided destination telephone device using the second communication system from a computer in the computer network based on address information acquired by the address information acquisition unit if a destination of the call unit is decided by the user's designation. According to the program, the communication device can be realized.

According to another aspect of the present invention, there is provided a program that makes a computer, which has a first communication system that communicates with an external telephone device via a telephone line network and a second communication system that communicates with an external computer via a computer network, realize functions of an acquisition unit that obtains data managed by a computer in the computer network and designated by the user using the second communication system from the above computer based on operation information of the-user input from a input device, and a call unit that makes a call to the telephone device corresponding to object data of the data acquisition unit using the first communication system if the object data is decided by the user's designation. According to the program, the communication device can be realized.

According to another aspect of the present invention, there is provided a program that makes a computer, which has a first communication system that communicates with an external telephone device via a telephone line network and a second communication system that communicates with an external computer via a computer network, realize functions of an acquisition unit that obtains data managed by a computer in the computer network and designated by the user using the second communication system from the above computer based on operation information of the user input from a input device, an identification information acquisition unit that obtains identification information of the telephone device associated with address information of the site from which the data is obtained from database which stores address information in the computer network and identification information of the telephone device corresponding to the address associating with each other, and a call unit that makes a call to the telephone device corresponding to the object data of the data acquisition unit using the first communication system based on identification information of the telephone device acquired by the identification information acquisition unit if the object data is decided by the user's designation. According to the program, the communication device can be realized.

Embodiments

Figure 1:
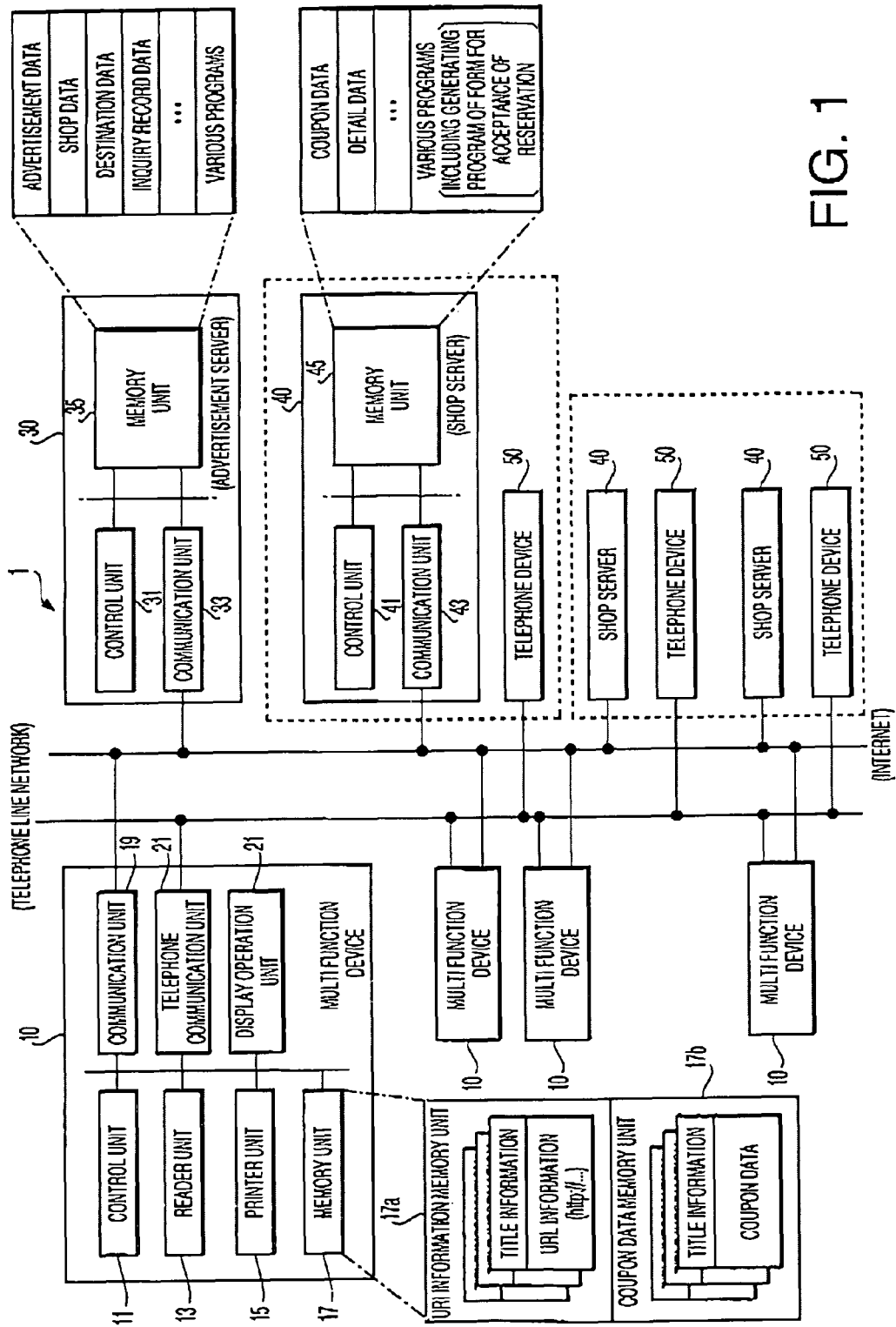
FIG. 1 is an illustration which represents a configuration of a network communication system according to aspects of the invention.

Hereinafter, embodiments according to the aspects of the invention will be described with reference to the accompanying drawings, FIG. 1 is an illustration which represents a configuration of a network communication system 1 to which the present invention is applied.

The network communication system 1 includes a plurality of digital multi function devices (MFD) 10 for respective users, an advertisement server 30, shop servers 40 and a telephone device 50 for each of a plurality of preliminarily registered shops. In the network communication system 1, each MFD 10, the advertisement server 30, each shop server 40 are connected to a computer network (in particular, TCP/IP network (so-called the Internet)), and MEDs 10 and the telephone devices 50 are connected to a telephone line network.

Each MFD 10 includes a control unit 11 that controls each unit, a reader unit 13 that optically reads original copy set in an auto document feeder (ADF) and generates image data, a print unit 15 that forms images on print papers based on image data received via a network from outside or generated by the reader unit 13, a storage unit 17 that is configured with non-volatile recording medium such as an NVRAM, a hard disk drive for storing various programs and data, a communication unit 19 that is connected to the computer network and is communicatable with each device in the network, and a telephone communication unit 21 that is connected to the telephone line network and communicatable with an external telephone device 50 via the telephone line network, and a display/operation unit 23.

The control unit 11 is provided with CPU, ROM, RAM, etc. (not shown), and controls each unit of the MFD 10 by making CPU execute various programs so that telephone function, facsimile function, computer communication function (TCP/IP communication function), copy function, scanner function, and printer function are realized.

In addition, the storage unit 17 includes a URL information storage unit 17A and a coupon data storage unit 173. The URL information storage unit 17A stores bookmark data that contains URL information and title information, and the coupon data storage unit 17B stores coupon management data that contains coupon data and title information.

Figure 2:
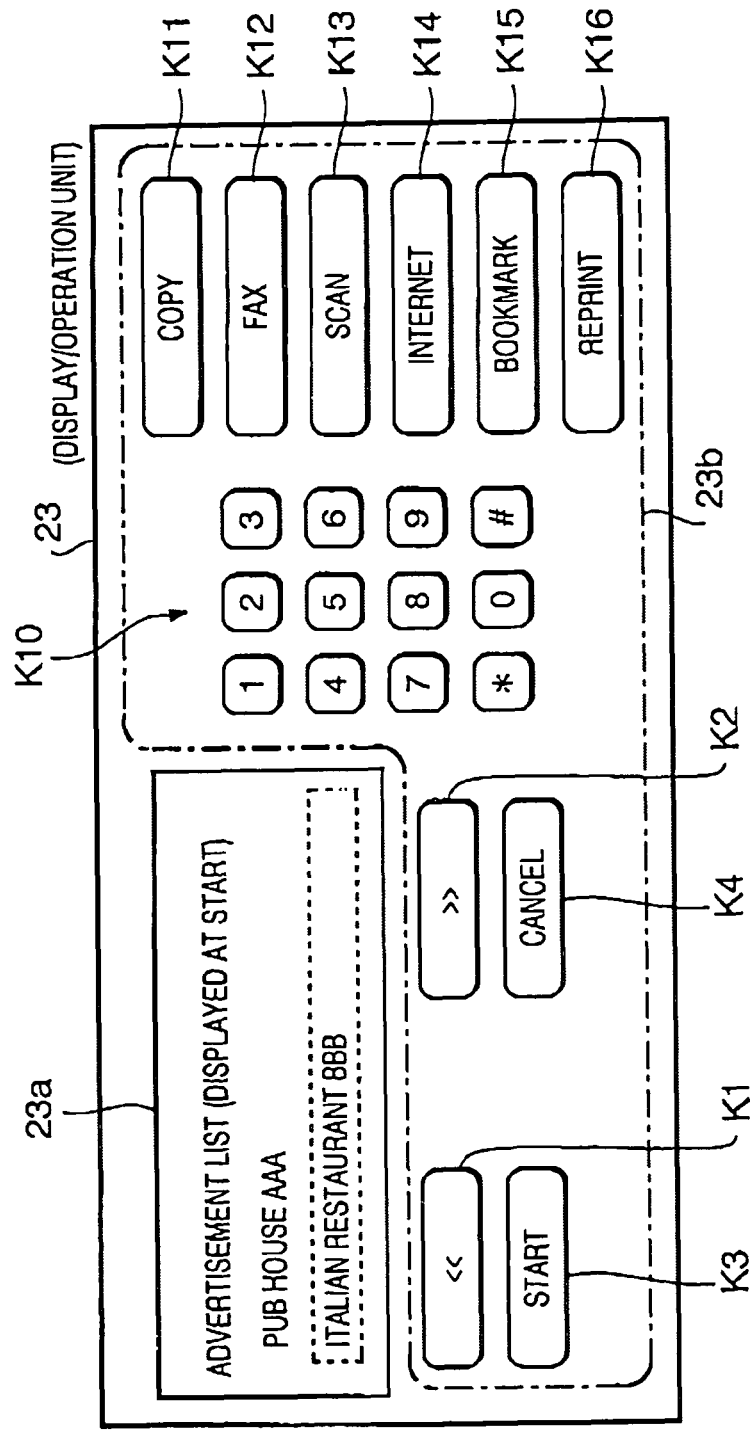
FIG. 2 is an illustration which shows a configuration of a display operation unit of a multi function device.

In addition, the display/operation unit 23 includes a display unit 23a having a liquid crystal display, and an operation unit 23 provided with various keys to be operated by a user. FIG. 2 shows a configuration of the display/operation unit 23. As shown in FIG. 2, the display/operation unit 23 includes an operation unit 23b, right and left cursor keys K1 and K2, and a "Start" key K3, a "Cancel" key K4, and a number key group K10 comprising asterisk, sharp and 0-9 keys, a copy key K11 for copy command, a fax key K12 for fax transmission command, a "Scan" key K13 for read command, an "Internet" key K14, a "Bookmark" key K15, and a "Reprint" key K16,. The display/operation unit 23 includes a handset, a speaker and a microphone for handsfree telephone communication.

The advertisement server 30 includes a control unit 31 which includes CPU, ROM, RAM (not shown), and executes various programs, and a communication unit 33 which is connected to a computer network and communicatable with each devices in the computer network, and a storage unit 35 which is provided with a hard disk drive, etc. and stores various programs. The storage unit 35 also stores advertisement data, shop data of each shop that is applied for registration to the advertisement server 30, destination data indicating telephone number(s) of each shop, and inquiry history data indicating inquiry count, which represents the number of inquiries having been made, for statistics.

FIG. 3A shows a configuration of advertisement data, FIG. 3B shows a configuration shop data, FIG. 3C shows a configuration of destination data, and FIG. 3D shows a configuration of the inquiry history data. Further, FIG. 4A shows an exemplary configuration of advertisement data using markup language, and FIG. 4B shows an exemplary configuration of shop data using markup language, As shown in FIG. 3A and FIG. 4A, in the advertisement data, information of a name of each shop that applies for registration, and URL information representing a data source from which the shop data is obtained are described in conjunction with each other.

As shown in FIG. 3B and FIG. 4B, the shop data includes information representing a name of a shop, introduction of the shop, URL information representing a site from which the telephone number and a shop code of the shop are obtained as shop identification information, URL information indicating a site from which coupon data stored in the shop server 40 of the shop is obtained, and URL information indicating a site from which detail data stored in the shop server 40 of the shop is obtained.

Further, as shown in FIG. 3C, destination data includes a shop code of each shop that applies for registration, and a telephone number of the shop in conjunction with each other. As FIG. 3D shows, inquiry history data includes shop code of each shop that applies for registration, and an inquiry count representing the number of inquiries to the shop (initial value is 0) in conjunction with each other.

Each shop server 40 has CPU, ROM, RAM (not shown), a control unit 41 that executes various programs, a communication unit 43 that is connected to a computer network and is communicatable with each device in the computer network, and a storage unit 45 that is provided with a hard disk drive, etc, and stores various programs. The storage unit 45 also stores coupon data and detail data of the corresponding shop. Here, the "coupon data" in the embodiment represents data (image data) necessary for producing (printing) image of the coupon (discount ticket), and detail data means data indicating details of the shop (access map, etc.).

The storage unit 45 stores a program for generation of form for acceptance of reservation which makes CPU of the control unit 41 execute processes that generate form data for acceptance of reservation indicating reservation contents in accordance with input information from an operator of a shop server 40 and write the reservation number to the storage unit 45 associated with the form data for acceptance of reservation.

Next, a process executed by the multi function processing machine 10 is described in detail. FIG. 5 schematically shows a process flow that the MFD 10 executes when "Internet" key K14 of the MFD 10 is depressed by the user.

If the "Internet" key K14 is depressed, the control unit 11 of the MFD 10 obtains advertisement data stored in the advertisement server 30 through the communication unit 19 from the advertisement server 30 based on the advertisement data and displays a shop list screen where letter strings representing shop names ("Pub House AAA", "Italian Restaurant BBB", etc. in FIG. 5) for each shop registered in the advertisement data are arranged scrollably on the display unit 23A.

When the user operates the cursor keys K1, K2 to position the cursor at a shop on the shop list screen and depresses the start key K3 in the state, the control unit 11 obtains shop data corresponding to the shop indicated by the cursor, based on URL information indicated by the advertisement data, from the advertisement server 30 via the communication unit 19, and based on the shop data, scrollably displays a shop introduction screen including letter strings representing shop names ("Italian Restaurant BBB" in FIG. 5), selection items ([1.telephone 2.coupon 3.details] in FIG. 5) and the shop introduction on the display unit 23A.

If the user depresses the key "1" among the key group K10 in accordance with the shop introduction screen, the control unit 11 inquires the advertisement server 30 for a telephone number of the shop based on URL information indicated by the shop data, and makes a call to the corresponding shop using the obtained telephone number as a result of the inquiry via the telephone communication unit 21. After the call, the control unit displays a coupon print confirm screen on the display unit 23A. If the user depresses the key "1" among the key group K10 as an affirmative declaration of intention, the control unit obtains coupon data from the shop server 40 based on URL information indicated by the shop data, and makes the print unit 15 print the image (coupon) based on the coupon.

If the user depresses the key "2" among the key group K10 in accordance with the shop introduction screen, the control unit 11 obtains coupon data from the shop server 40 based on URL information indicated by the shop data, and makes the print unit 15 print the image (coupon) based on the coupon, and displays a call confirm screen on the display unit 23A.

Then, if the user depresses the key "1" among the key group K10 as an affirmative declaration of intention, the control unit 11 inquires the advertisement server 30 for a telephone number of the shop based on URL information indicated by the shop data, and makes a call to the corresponding shop using the obtained telephone number as a result of the inquiry via the telephone communication unit 21.

If the user depresses the key "3" among the key group K10 in accordance with the shop introduction screen, the control unit 11 obtains the detail data from the sop server 40 based on URL information indicated by the shop data, and makes the print unit 15 print the image (access map, etc.) based on the detail data The process describe above is realized in the embodiment by the control unit 11 constantly repeating execution of the main process shown in FIG. 6. FIG. 6 is a flowchart which shows a main process repeatedly executed by the control unit 11.

In the main process, the control unit 11 waits for input of operation information generated in accordance with the user's operation of the display/operation unit 23 (S110). When the operation information is input (S110: YES), based on the input operation information, it is determined whether the user operation is a call operation (S120). In particular, if operation information indicating offhook is input from the display/operation unit 23, the user's operation is determined to be a call operation. Then, if the user's operation is determined to be a call operation (S120: YES), the process goes to S130, and a call operation accepting process is executed. FIG. 7 is a flowchart which shows a call operation accepting process that the control unit 11 executes.

In the call operation accepting process, the control unit 1 makes a call via the telephone communication unit 21 to the corresponding shop using the telephone number input by the user through the display/operation unit 23 (S410), and connects the shop corresponding to the input telephone number and the multi function processing machine 10 communicatable with each other. After execution of this process, the control unit goes to S420, and inquires the advertisement server 30 through the communication unit 19 whether the server stores shop data corresponding to the input telephone number. Here, the storage unit 17 of the multi function processing machine 10 stores URL information representing a site to inquire. The control unit 11 inquires the advertisement server 30 whether the server has shop data corresponding to the input telephone number by transmitting inquiry data on existence of shop data corresponding to the input telephone number to the site represented by the URL through the communication unit 19.

After execution of S420, the control unit 11 goes to S430, and waits until the control unit receives response data transmitted from the advertisement server 30 via the communication unit 19. If the control unit receives the response data, the control unit goes to S440, and determines whether the advertisement server 30 has the shop data corresponding to the telephone number input by the above user based on the response data. Then, if it is determined that the advertisement server has not the shop data (S440: NO), the call operation accepting process is terminated. If it is determined that the advertisement server has the shop data (S440: YES), the control unit goes to S450, and requires the advertisement server 30 for shop data stored in the site of the URL based on URL information indicated by the response data through the communication unit 19.

After execution of S450, the control unit 11 goes to S460, and waits until the control unit receives the required shop data from the advertisement server 30 via the communication unit 19. Then, if the control unit receives the shop data, the control unit goes to S470, and bookmarks the site of URL from which the shop data is obtained. In particular, the control unit generates bookmark data which contains URL information indicating the URL of the site from which the data is obtained and title information of a shop name indicated by the shop data, and registers the bookmark data in a URL information storage unit 17A. If bookmark data of the same shop is already registered in the URL information storage unit 17A, the bookmark data is overwritten, and the above generated bookmark data is registered in the URL information storage unit 17A, After execution of S470, the control unit 11 goes to S480, and displays the coupon print confirm screen on the display unit 23A. Thereafter, the control unit waits until the user depresses the key "1" as an affirmative declaration of intention, or the user depresses the key "2" as a negative declaration of intention. Then, if the user depresses the key "2", it is determined that execution of coupon print is prohibited (S490: NO), without execution of steps S510-S540, the control unit goes to S550, and execute shop introduction process based on the shop data received in S460 (see FIG. 8). After the shop introduction process at S550 is completed, the control unit 11 terminates the call operation accepting process, and goes to S110.

If the user depresses the key "1" in accordance with the coupon print confirm screen, the control unit 11 determines that execution of coupon print is allowed (S490: YES). The control unit goes to S510, and requests the corresponding shop server 40 for coupon data via the communication unit 19 based on URL information, which is indicated by the shop data (URL information between coupon URL tags shown in FIG. 4A), representing the site from which the coupon data is to be obtained. Then, after execution of S510, the control unit 11 goes to S520, and waits until the control unit receives coupon data as response data via the communication unit 19. If the control unit receives the coupon data, the control unit goes to S530, and the received coupon data is printed out by the print unit 15. That is, the control unit controls the print unit 15, and makes the print unit print an image (coupon).

After execution of S530, the control unit 11 goes to S540, and write the received coupon data in the coupon data storage unit 17B. In particular, the control unit generates coupon management data containing the received coupon data and title information of a shop name indicated by the shop data, and stores the data in the coupon data storage unit 17B. Thereafter, the control unit 11 goes to S550, and executes the shop introduction process. Then, after the shop introduction process in S550 is completed, the control unit terminates the call operation accepting process, and goes to S110.

Then, if it is determined that the user's operation is not a call operation (S120: NO), the control unit 11 determines whether the user's operation is advertisement browse operation based on the user's operation information input using the display operation unit (S140). In particular, in the embodiment, if the input user's operation information is information indicating a depress operation of the "Internet" key K14, it is determined that the user's operation is an advertisement browse operation.

Then, if it is determined that the user's operation is the advertisement browse operation at S140, the control unit 11 goes to S150, and requests advertisement data from the advertisement server 30 via the communication unit 19 based on URL information representing the site from which the advertisement data is obtained that the storage unit 17 stores. After execution of S150, the control unit 11 goes to S160, and waits until the control unit receives advertisement data requested from the advertisement server 30 as response data via the communication unit 19. If the control unit receives the advertisement data, the control unit goes to S170, and displays an advertisement list screen on the display unit 23 based on the received advertisement data. Here, the control unit displays an advertisement list screen where letter strings representing shop names are arranged on the display unit 23A based on information representing shop name of each shop contained in the advertisement data, and positions the cursor at the letter string at the top of the list.

After execution of S170, the control unit 11 goes to S180, and waits for input of an operation information from the user generated by the user's operation of the display/operation unit 23.

Then, if the user's operation information is input (S180: YES), the control unit 11 determines whether the user operation is a cursor operation based on the input operation information (S190). In particular, if the input operation information is information indicating a depress operation of the cursor key K1 or K2, it is determined that the user's operation is a cursor operation.

If it is determined that the user's operation is the cursor operation (S190: YES), the control unit 11 goes to S200, updates the advertisement list screen as indicated by the user's cursor operation, and positions the cursor at a letter string of other shop. Thereafter, the control unit goes to S180.

On the other hand, if it is determined that the user's operation is not the cursor operation (S190: NO), the control unit 11 goes to S210, and determines whether the user's operation is a selection fix operation of the shop. In particular, if the input operation information is information indicating a depress operation of the "Start" key K3, it is determined that the user's operation is a selection fix operation.

Then, if it is determined that the user's operation is the selection fix operation (S210: YES), the control unit 11 goes to S220, and requests shop data corresponding to the selected shop from the advertisement server 30 via the communication unit 19 based on URL information representing the site from which the shop data is obtained. Thereafter, the control unit 11 waits until the control unit receives the requested shop data from the advertisement server 30 via the communication unit 19 (S230). If the control unit receives the shop data, the control unit goes to S240, and executes the shop introduction process based on the shop data received at S230 (see FIG. 8).

Then, after the shop introduction process is completed at S240, the control unit 11 goes to S250, and displays an advertisement list screen on the display unit 23 based on the already received advertisement data Here, the control unit positions the cursor at the same position before the shop introduction process is executed, and displays the advertisement list screen. Thus, after execution of the process at S250, the control unit 11 goes to S180.

Then, if it is determined that the user's operation is not a selection fix operation of a shop (S210: NO), the control unit 11 goes to S260, and determines whether the user's operation is a cancel operation. In particular, if the input operation information is information indicating a depress operation of the "Cancel" key K4, it is determined that the user's operation is a cancel operation.

Then, if the user's operation is determined to be a cancel operation (S260: YES), the main process is once terminated, the control unit goes to S110. If it is determined that the user's operation is not a cancel operation (S260: NO), the control unit goes to S270, and executes processes corresponding to the user's operation (for example, an output process of denial sound, etc.), then, goes to S180.

On the other hand, if it is determined that the user's operation is not the advertisement browse operation at S140 (S140: NO), the control unit 11 determines whether the user's operation is a bookmark operation based on the user's operation information input using the display/operation unit 23 (S300). In particular, in the embodiment, if the "Bookmark" key 15 is depressed, it is determined that the user's operation is a bookmark operation.

Then, if the user's operation is determined to be a bookmark operation (S300: YES), the control unit goes to S310, and displays a URL selection screen on the display unit 23A. Here, a URL selection screen is a display of a list of titles of each bookmark data which a URL information storage unit 17A stores.

Further, if the user selects one of the titles displayed on the URL selection screen, the control unit 11 requests the corresponding shop data from the advertisement server 30 based on the URL information of the bookmark data corresponding to the title selected by the user through the communication unit 19 (S320). Thereafter, the control unit 11 waits until the control unit receives the requested shop data from the advertisement server 30 via the communication unit 19 (S330). If the control unit receives the shop data, the control unit goes to S340, and executes the shop introduction process based on the shop data received at S330 (see FIG. 8). Then, after the shop introduction process at S340 is completed, the control unit terminates the main process once, and goes to S110.

Then, if it is determined that the user's operation is not a bookmark operation (S300: NO), the control unit 11 goes to S350, and determines whether the user's operation is a reprint operation. In particular, in the embodiment, if the "Reprint" key 16 is depressed, it is determined that the user's operation is a reprint operation.

Then, if the user's operation is determined to be a reprint operation (S350: YES), the control unit 11 displays a data selection screen on the display unit 23A at S360. Here, a data selection screen is a display of a list of titles of each coupon management data which a coupon data storage unit 17B stores.

Further, if the user selects one of the titles displayed on the data selection screen, the control unit 11 goes to S370, the coupon data contained in the coupon management data corresponding to the title selected by the user is printed out by the print unit 15. That is, the control unit controls the print unit 15, and makes the print unit print an image (coupon) on print papers. Thereafter, the control unit 11 terminates the main process once, and goes to S110.

Then, if it is determined that the user's operation is not a reprint operation (S350: NO), the control unit 11 goes to S390, and executes the processes corresponding to the user's operation. Then, the control unit terminates the main process, and goes to S110.

Next, a shop introduction process executed at S240, S340 and S550 by the control unit 11 is described. FIG. 8 is a flowchart which shows a shop introduction process executed by the control unit 11. In the shop introduction process, the control unit 11 resets a call flag and a print flag, stores the flag values in RAM (S605), and displays a shop introduction screen (see FIG. 5) on the display unit 23A based on the shop data received before at S230, S330 or S430 (S610).

After execution of S610, the control unit 1 waits for input of an operation information from the user generated by the user's operation of the display/operation unit 23 (S620). When the operation information is input (S620: YES), based on the input operation information, it is determined whether the user operation is a cancel operation (depress operation of "Cancel" key K4). Then, if the user's operation is determined to be a cancel operation (S630: YES), the shop introduction process is terminated. If it is determined that the user's operation is not a cancel operation (S630: NO), the control unit goes to S640.

At S640, the control unit 11 determines whether the user's operation is a call operation. In particular, if the input operation information is information indicating a depress operation of the key "1", it is determined that the user's operation is a call operation. If the input operation information is other information, it is determined that the user's operation is not a call operation.

Then, if the user's operation is determined to be a call operation (S640: YES), the process goes to S650. Based on URL information which indicates sites from which the telephone number of the shop contained in the shop data is obtained (URL information between $phone_{13}$ URL tags shown in FIG. 4B), the control unit transmits inquiry data on a telephone number containing shop code of the shop indicated by the shop data (shop code described as an argument in URL information ("ID0000" shown in FIG. 4B)) via the communication unit 19 to the advertisement server 30. The control unit 11 inquires the advertisement server 30 for a telephone number of the shop.

Thereafter, the control unit 11 goes to S660, and waits until the control unit receives response data containing the telephone number from the advertisement server 30 via the communication unit 19. If the control unit receives the response data from the advertisement server 30, the control unit goes to S670, makes a call to a telephone device 50 of the telephone number, and establishes connection with the telephone device of the telephone number which is contained in the response data.

After execution of S670, the control unit 11 goes to S680, and bookmarks the site of URL from which the shop data which is already received and displayed. That is, the control unit generates bookmark data which contains URL information indicating the URL of the site from which the data is obtained and title information of a shop name indicated by the shop data, and registers the bookmark data in a URL information storage unit 17A. If bookmark data of the same shop is already registered in the URL information storage unit 17A, the bookmark data is overwritten, and the above generated bookmark data is registered in the URL information storage unit 17A.

After execution of S680, the control unit 11 goes to S690, and sets a call flag. Thereafter, it is determined at S700 whether a print flag is set. Then, if it is determine that the print flag is not set (S700: NO), the control unit goes to S710. If it is determined that the print flag is set (S700: YES), the control unit goes to S650 instead of going to S710.

At S710, the control unit 11 displays the coupon print confirm screen (see FIG. 5) on the display unit 23A. Thereafter, the control unit goes to S720, and waits until the user depresses the key "1" as an affirmative declaration of intention, or the user depresses the key "2" as a negative declaration of intention. Then, if the user depresses the key "2", it is determined that execution of coupon print is prohibited (S720: NO), the control unit goes to S610. If the user depresses the key "1", the control unit 1 determines that execution of coupon print is allowed (S720: YES), and goes to S740.

Then, if it is determined that the user's operation is not a call operation (S640: NO), the control unit 11 goes to S730, and determines whether the user's operation is a coupon print operation. In particular, if the input operation information is information indicating a depress operation of the key "2", it is determined that the user's operation is a coupon print operation. If the input operation information is other information, it is determined that the user's operation is not a coupon print operation. Then, if the user's operation is determined to be a coupon print operation (S730: YES), the control unit 11 goes to S740. If it is determined that the user's operation is not a coupon print operation (S730: NO), the control unit 11 goes to S820.

At S740, the control unit 11 requests coupon data from the corresponding shop server 40 via the communication unit 19 based on the URL information representing the site from which the coupon data is obtained indicated by the shop data, Then, after execution of S740, the control unit goes to S750, and waits until the control unit receives coupon data as response data via the communication unit 19. Then, if the control unit receives the coupon data, the control unit goes to S760, and the received coupon data is printed out by the print unit 15.

After execution of S760, the control unit 11 goes to S770, and write the received coupon data in the coupon data storage unit 177B. In particular, the control unit generates coupon management data containing the received coupon data and title information of a shop name indicated by the shop data, and stores the data in the coupon data storage unit 17B. Thereafter, the control unit 11 goes to S780, sets a print flag, and then goes to S790.

At S790, the control unit 11 determines whether a call flag is set. If it is determined that the call flag is not set (S790: NO), the control unit goes to S800. If it is determined that the call flag is set (S790: YES), the control unit goes to S610 instead of going to S800.

At S800, the control unit 11 displays a call confirm screen on the display unit 23A (see FIG. 5). Thereafter, the control unit waits until the user depresses the key "1" as an affirmative declaration of intention, or the user depresses the key "2" as a negative declaration of intention (S810). Then, if the user depresses the key "2", it is determined that execution of making a call is prohibited (S810: NO), the control unit goes to S610. If the user depresses the key "1", the control unit 11 determines that execution of making a call is allowed (S810: YES), and goes to S650.

At S820, the control unit 11 determines whether the user's operation is a detail print operation. In particular, if the input operation information is information indicating a depress operation of the key "3", it is determined that the user's operation is a detail print operation. If the input operation information is other information, it is determined that the user's operation is not a detail print operation.

Then, if the user's operation is determined to be a detail print operation (S820: YES), the control unit 11 goes to S830. Based on URL information which indicates sites from which the detail data is obtained (URL information between detail_ URL tags shown in FIG. 4B), the control unit 11 requests detail data from the corresponding shop server 40 via the communication unit 19. Then, after execution of S830, the control unit 11 goes to S840, and waits until the control unit receives detail data as response data via the communication unit 19. If the control unit receives the detail data, the control unit goes to S550, and the received detail data is printed out by the print unit 15. Thereafter, the control unit goes to S610.

If the control unit 11 determines that the user's operation is not a detail print operation (S820: NO), the control unit goes to S860, and executes processes corresponding to the user's operation based on the input operation information. For example, if the cursor key K1 or K2, the display screen is scrolled. If the unknown operation is detected a process generating denial sound is executed. Thereafter, the control unit 11 goes to S620, and waits for next operation. Then, the user does a cancel operation (S630: YES), the shop introduction process is terminated.

The multi function processing machine 10 of the embodiment has a function to obtain form data for acceptance of reservation from the shop server 40 by transforming the DTMF signal into a number sequence and transmitting the sequence to the shop server 40, if DTMF signal detected by receiving DTMF (Dial Tone Multi Frequency) signal from the telephone device 50 of the destination during phone call, or a user's operation of the number keys of the multi function processing machine 10. Here, the form data for acceptance of reservation is generated by the shop server 40 with the form for acceptance of reservation generation program which is described above. That is, the above described function works effectively in the following way. During a phone call between a user of the multi function processing machine 10 and a salesperson, the salesperson operates the shop server 40 and makes the shop server 40 generate the form data for acceptance of reservation. Then, a reservation number notified to the salesperson from the shop server 40 is transmitted to the user's multi function processing machine 10 using DTMF signals by the salesperson's operation of the telephone device 50. Or the user of the multi function processing machine 10 inputs the reservation number orally notified by the salesperson with number keys for confirmation of reservation intention.

FIG. 9 is a flowchart which shows a background print process during a phone call that the control unit 11 of the multi function processing machine 10 executes to realize this function. The control unit 11 of the multi function processing machine 10 executes the background print process during a phone call, if the telephone communication unit 21 becomes in the calling state due to the call process at S670.

If the background print process during a phone call is executed, the control unit 11 determines whether the calling state is terminated. If the calling state is not determined to be terminated (S910: NO), the process goes to S920, and it is determined whether the telephone communication unit 21 detects DTMF signal (S920). Then, if it is determined that the telephone communication unit 21 does not detect DTMF signal, the process goes to S910. Due to such processes, the control unit 11 waits until the calling state terminates or the telephone communication unit 21 detects DTMF signal.

Then, if the calling state terminates (S910: YES), the background print process during a phone call is terminated. If the telephone communication unit 21 detects DTMF signal (S920: YES), after the conversion process of the telephone communication unit 21 is executed, the number sequence corresponding to DTMF signal obtained from the telephone communication unit 21 is transmitted to the corresponding shop server 40 of the shop. In particular, in the embodiment, based on the URL information of the shop server 40 indicated by the shop data, request data containing number sequence corresponding to DTMF signal of a form for acceptance of reservation is transmitted to the corresponding shop server 40 (S930).

Then, after execution of S930, the control unit 11 goes to S940, and waits until the control unit receives response data transmitted from the shop server 40 via the communication unit 19. If the control unit receives the response data, the control unit goes to S950, and it is determined whether the received response data is form data for acceptance of reservation. If the response data is determined to be form data for acceptance of reservation (S950: YES), the received form data for acceptance of reservation is printed out by the print unit 15 (S960).

On the other hand, if it is determined that the received data is not form data for acceptance of reservation (that is to say, if it is determined that the received response indicates error data), the unit 11 displays error information on the display unit 23A (S970). Thereafter, the control unit goes to S910 based on the response data Then, if the calling state terminates (S910; YES), the background print process during a phone call is terminated.

Next, the process which the control unit 31 of the advertisement server 30 executes is described. FIG. 10 is a flowchart which shows an advertisement server response process that the control unit 31 of the advertisement server 30 executes. The control unit 31 executes the advertisement server response process each time the control unit receives data from outside through the communication unit 33.

In the advertisement server response process, the control unit 31 determines whether the received data is a request for advertisement data at S1010. If the received data is determined to be data requesting advertisement data (S1010: YES), the above advertisement data is read from the storage unit 35, and transmit the advertisement data as response data to the apparatus that requests the data (multi function processing machine 10) via the communication unit 33 (S1020). Thereafter, the advertisement server response process is terminated.

On the other hand, if it is determined that the received data is not data requesting for advertisement data (S1010: NO), the control unit 31 goes to S1030, it is determined whether the received data is data requesting for shop data. Then, if the received data is determined to be data requesting for shop data (S1030: YES), the required shop data is read from the storage unit 35, and transmit the shop data to the apparatus that requests the data (multi function processing machine 10) via the communication unit 33 (S1040). Thereafter, the advertisement server response process is terminated.

Otherwise, if the received data is not determined to be data requesting for shop data (S1030: NO), the control unit 31 goes to S1050, it is determined whether the received data is inquiry data on a telephone number. If the received data is determined to be inquiry data on telephone number (S1050: YES), the control unit 31 goes to S1060, and executes a number search process. In addition, FIG. 1 is a flowchart which shows a number search process that is executed by the control unit 31.

In the number search process, the control unit 31 searches for a telephone number corresponding to the shop code stored in the inquiry data within destination data, and transmit the telephone number corresponding to the shop code which is obtained as a result of the search and stored in the response data to the apparatus that requests the data (multi function processing machine 10) via the communication unit 33 (S1063). In addition, after execution of S1063, the control unit 31 goes to S1065, a number of the shop (count number of inquiry which is associated with the shop code of the searched telephone number) in inquiry record data that is stored by the storage unit 35 is added up by 1. Thereafter, the number search process is terminated. In addition, after the number search process at S1060 is completed, the control unit 31 terminates the advertisement server response process.

If it is determined that the received data is not inquiry data on a telephone number at S1050 (S1050: NO), the control unit 31 goes to S1070, and it is determined whether the received data is inquiry data on existence of shop data. If the received data is determined to be inquiry data on existence of shop data, a shop search process is executed at S1080. FIG. 12 is a flowchart which shows a shop search process that is executed by the control unit 31.

In the shop search process, the control unit 31 searches for a shop code corresponding to the telephone number stored in the inquiry data within destination data stored by the storage unit 35 at S1081. If the shop code corresponding to the telephone number stored in the inquiry data is obtained as a result of the search, a shop data is searched indicated by the shop code in the storage unit 35.

Then, if the storage unit 35 has a shop data indicated by the shop code (that is to say, a shop data corresponding to the telephone number stored in the inquiry data), it is determined that the shop data exists in the storage unit 35 (S1083: YES), the process goes to S1085. Then, response data including information of existence of the shop data and URL information representing a site from which the shop data is obtained corresponding to the telephone number stored in the inquiry data is transmitted to the apparatus that requests the data (multi function processing machine 10) via the communication unit 33. Thereafter, the shop search process is terminated.

On the other hand, if the shop code corresponding to the telephone number stored in the inquiry data is not obtained as a result of the search, or the shop data corresponding to the shop code does not exist in the storage unit 35, it is determined that the shop data does not exist (S1083: NO), response data including information of nonexistence of the shop data is transmitted to the apparatus that requests the data (multi function processing machine 10) via the communication unit 33 (S1087). Thereafter, the shop search process is terminated. In addition, after the shop search process is completed in this way at S1080, the advertisement server response process is terminated.

Otherwise, if it is determined that the received data is not inquiry data on existence of shop data at S1070 (S1070: NO), the control unit 31 terminates the advertisement server response process after execution of the other processes corresponding to the received data. The process operation of the advertisement server 30 is described above, lastly, the process operation of each shop server 40 is described as follows. FIG. 13 is a flowchart which shows a shop server response process that is executed by each shop server 40. The control unit 41 executes the shop server response process each time the control unit receives data from outside through the communication unit 43.

In the shop server response process, the control unit 41 determines whether the received data is data requesting for coupon data (S1110). If the received data is determined to be data requesting for coupon data (S1110: YES), the control unit transmits coupon data stored in the storage unit 45 as response data to the multi function processing machine 10 that requests the data via the communication unit 43 (S1120). Thereafter, the shop server response process is terminated.

On the other hand, if it is determined that the received data is not data requesting for coupon data (S1110: NO), the control unit 41 goes to S1130, and it is determined whether the received data is data requesting for detail data. Then, if the received data is determined to be data requesting for detail data (S1130: YES), the control unit transmit detail data stored in the storage unit 45 as response data to the multi function processing machine 10 that requests the data via the communication unit 43 (S1140). Thereafter, the shop server response process is terminated.

Otherwise, if it is determined that the received data is not data requesting for detail data (S1130: NO), the control unit 41 goes to S1150, and the control unit determines whether the received data is data requesting for form for acceptance of reservation including a number sequence. Then, the received data is determined to be data requesting for a form for acceptance of reservation (S1150: YES), the process goes to S1160, the control unit searches form data for acceptance of reservation corresponding to the number sequence in the storage unit 45.

As a result of the search, if the form data for acceptance of reservation is obtained, the control unit 41 determines Yes at S1170, the control unit transmits the obtained form data for acceptance of reservation in the search as response data to the multi function processing machine 10 that requests the data via the communication unit 43 (S1180). Thereafter, the shop server response process is terminated. On the other hand, if the form data for acceptance of reservation is not obtained in the above search, the control unit 41 determines No S1170, the control unit transmits response data including error information to the multi function processing machine 10 that requests the data via the communication unit 43 (S1190). Thereafter, the shop server response process is terminated.

Otherwise, if the control unit 41 determines that received data is not data requesting form for acceptance of reservation (S1150: NO), the control unit terminates the shop server response process after execution of the other processes corresponding to the received data at S1200.

The network communication system 1 of the embodiment of the invention is described above, according to the embodiment of the present invention, the multi function processing machine 10 is configured so that related devices in the different kind of networks (telephone line network, computer network) are accessed in conjunction with the machine, and user's operations to access to the related devices can be reduced.

For example, in the network communication system 1 of the embodiment of the invention, by user's operation of the display operation unit 23 as an input device, a call operation is done (S120: YES, S640: YES), the multi function processing machine 10 makes a call to a telephone device having the telephone number which is input (designated) by the user, or to a telephone device having the telephone number corresponding to the shop designated by the user (S410, S670). When a destination is decided by the user's designation and a call operation to the destination is executed, the multi function processing machine 10 displays a coupon print confirm screen (S480, S710). After confirmation of the user's intention, based on the URL information representing the site from which coupon data is obtained indicated by the shop data that is preliminarily acquired, the coupon data corresponding to the destination telephone device (shop) is obtained via the computer network from the corresponding shop server 40 (S510-S520, S740-S750). Then, the coupon data is printed out by the print unit 15 (S530, S760). That is, in the embodiment, in conjunction with a call process, the coupon data corresponding to the destination shop is obtained from the shop server 40 in the computer network which is different from the telephone line network.

Therefore, according to the embodiment of the invention, by only making a call to a shop for reservation or inquiry, a user can obtain coupon data of the shop. It is not necessary for a user to operate a personal computer, etc. and obtain the data from a computer network (the Internet) in the conventional way, and a user is free from bothersome operation to obtain coupon data.

In the network communication system 1 of the embodiment of the invention, if a coupon print operation is done by user's operation of the display/operation unit 23 (S730: YES), the multi function processing machine 10 obtains coupon data of a shop designated by the user from a shop server 40 which manages the coupon data (S740, S750).

When a coupon data is decided by the user's shop designation, and acquisition of the coupon data is executed, the multi function processing machine 10 displays a call confirm screen (S800). After confirmation of the user's intention, a telephone number of a shop corresponding to the obtained coupon data is obtained (S660), a call is made to a telephone device of the telephone number (S670). That is, in the embodiment, in conjunction with a coupon data acquisition process, a call is made to a destination of a telephone number of a shop corresponding to the coupon data, and communication is established between a telephone device 50 of the shop and the multi function processing machine 10.

Therefore, according to the embodiment, by only obtaining the coupon data, the user can talk with a salesperson over the telephone without operation of inputting telephone number of the shop, etc., and can easily make actions such as reservations.

In the embodiment the received coupon data is stored in the storage unit 17 which is nonvolatile memory medium installed in the apparatus (S540, S770). The multi function processing machine 10 is configured so that the coupon data can be reprinted, so the coupon can be generated promptly depending on the user's need.

In the embodiment, a data group (corresponding to a database of the present invention) which stores telephone numbers of shops and associated URL information of sites from which the coupon data of the shop is obtained is placed in the advertisement server 30, not in the multi function processing machine 10. Therefore, data update (shop data registration, etc.) is easy. Further, in the embodiment, the system is configured so that coupon data is stored in a shop server installed in each shop. Therefore, management of coupon data can be done by salespersons, etc., and update and management of the coupon data are easily done.

The communication device of the present invention corresponds to the multi function processing machine 10, and database corresponds to a collection of data including shop data of each shop and destination data which the storage unit 35 stores. A call unit included in the communication device in claim 1-4 is realized by the control unit 11 which makes a call through the telephone communication unit 21 to the telephone device designated by the user (the telephone device designated by the telephone number, or the telephone device of the shop designated by shop selection) based on the operation information input using the display operation unit.

An address information acquisition unit is realized by the control unit 11 which obtains shop data storing URL information representing sites from which coupon data of coupon usable at the destination shops is acquired (S450-S460), and obtains shop data of the shops that can be destinations when user's shop selection among destination candidates is done using shop list screen (S220-S230).

A function of a data acquisition unit included in a communication device is realized in processes (S510-S520, S740-S750 in the case of Yes at S720) executed by the control 11 which obtains coupon data corresponding to the destination based on the URL information representing the site from which coupon data is obtained indicated by the shop data from the apparatus (shop server 40) in the computer network through the communication unit 19 if the destination is decided and a call is made.

A function of a data acquisition unit of the communication device is realized in process (S730-S750) executed by the control unit 11 which obtains coupon data of the shop designated by the user if a coupon print operation is done by the user. A function of a call unit of the communication device is realized in a process (S670 in the case of Yes at S810) executed by the control unit 11 which makes a call to the telephone device of the shop corresponding to the coupon data after the coupon data is obtained. Further, a function of an identification information acquisition unit is realized in processes (S650-S660 in the case of Yes at S810) executed by the control unit 11 which obtains telephone number of the shop corresponding to coupon data obtained by inquiry to the advertisement server 30 based on the URL information representing a site from which the telephone number is obtained indicated by the shop data.

A function of a data record unit is realized in processes S540, S770 executed by the control unit 11. A function of a image output unit is realized in processes S530, S760 executed by the control unit 11. Further, a computer that stores shop data corresponds to the shop server that stores coupon data.

A communication device, a network communication system and a program of the present invention is not limited to the above described embodiments. According to the claims of the invention, various embodiments may be realized.

For example, in the above embodiment, at S480, S710, a coupon print confirm screen is displayed on a display unit 23a and user's intention is confirmed. However, the multi function processing machine 10 may be configured so that coupon data is printed out compellingly without confirmation of user's intention. That is, the multi function processing machine 10 may be configured so that in a call operation accepting process shown in FIG. 7, steps S480 and S490 are deleted, the process goes to S510 compellingly after execution of S470. Similarly, the multi function processing machine 10 may be configured so that in a shop introduce process shown in FIG. 8, steps S710 and S720 are deleted, and if it is determined Yes at S700, the process goes to S610, if it is determined No at S700, the process immediately goes to S740.

In the above embodiment, a call confirm screen is displayed on a display unit 23a, and user's intention is confirmed. However, the multi function processing machine 10 may be configured so that the call process to the shop is compellingly executed without confirmation of user's intention. That is, the multi function processing machine 10 may be configured so that if steps S800 and S810 in shop introduction process shown in FIG. 8 are skipped and it is determined Yes at S790, the control unit goes to S610, and if it is determined No at S790, the control unit goes immediately to S650.

In addition, in the above embodiment, URL information which indicates a site from which a telephone number is obtained is stored, not telephone numbers of shops. However, a telephone number may be stored as shop data instead of URL information representing a site from which the telephone number is obtained.

The network communication system 1 of the embodiment is configured so that a telephone number of a shop is inquired to the advertisement server 30, because frequency of use advertisement service provided by the advertisement server 30 can be output as statistics information. As in the embodiment, when frequency of use advertisement service is collected for each shop, beneficialness of advertisement service can be appealed to shops as customers from a business standpoint. In addition, an aggregate result may be assumed advertisement effect, and adequate accounting can be realized by charging a fee according to the aggregate result.

What is claimed is:
1. A communication device, comprising:
a first communication system configured to communicate with a plurality of external telephone devices through a telephone line network;
a second communication system configured to communicate with a plurality of computers on a computer network;
a display device; and
a controller configured to execute processes comprising:
controlling the display device to display a first screen configured to receive a designation of a particular destination in accordance with an input operation;
obtaining particular telephone information identifying a telephone device associated with the particular destination and particular URL information linking to predetermined data associated with the particular destination from a storage device in response to receiving the designation of the particular destination,
wherein the storage device is configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information;
controlling the display device to display a second screen configured to receive an instruction indicating whether a telephone call is to be made to the telephone device associated with the particular destination in response to receiving the designation of the particular destination;
controlling the first communication system to call the telephone device associated with the particular destination using the particular telephone information in response to receiving an instruction to make the telephone call to the telephone device associated with the particular destination;
controlling the display device to automatically display a third screen, without receiving of an additional instruction to display the third screen, in response to initiating the telephone call to the telephone device associated with the particular destination, the third screen configured to receive an instruction indicating whether the predetermined data associated with the particular destination is to be obtained; and
controlling the second communication system to obtain the predetermined data associated with the particular destination from a computer of the plurality of computers on the computer network in response to receiving an instruction to obtain the predetermined data associated with the particular destination, the computer being identified by the particular URL information.

2. The communication device according to claim 1, wherein the controller is further configured to obtain the particular URL information, which is associated with the particular telephone information, from a database storing address information and the plurality of pieces of telephone information, the database associating the plurality of pieces of telephone information with the address information.

3. The communication device according to claim 2, wherein the controller is further configured to obtain address information associated with other telephone information associated with another telephone device from the database, and
wherein the address information comprises a potential destination.

4. The communication device according to claim 2,
wherein the controller is further configured to obtain address information, which corresponds to the telephone device associated with the particular destination, from the database in response to receiving the designation of the particular destination, and
wherein the controller is further configured to control the second communication system to obtain the predetermined data associated with the particular destination based on the address information in response to obtaining the address information.

5. The communication device according to claim 1, further comprising:
a data record device configured to record the predetermined data associated with the particular destination in a nonvolatile memory medium.

6. The communication device according to claim 1, further comprising:
an image output device configured to output images based on the predetermined data associated with the particular destination.

7. The communication device according to claim 6,
wherein the image output device is configured to print out images based on the predetermined data associated with the particular destination.

8. The communication device according to claim 2,
wherein the telephone device associated with the particular destination is disposed at a shop, the database storing the particular telephone information, which is at the shop, and the address information, which represents a site from which shop data is obtained.

9. The communication device according to claim 8,
wherein the address information, which represents the site from which the shop data is obtained, further comprises address information of a site from which coupon data representing a coupon associated with the shop is obtained.

10. The communication device according to claim 1, wherein the controller is configured to execute processes further comprising:
controlling the display device to display a fourth screen configured to receive another instruction whether a telephone call is to be made to the telephone device associated with the particular destination or the predetermined data associated with the particular destination is to be obtained in accordance with another input operation; and
controlling the first communication system to call the telephone device associated with the particular destination using the particular telephone information in response to receiving another instruction to make the telephone call to the telephone device associated with the particular destination.

11. The communication device according to claim 1, wherein the controller is configured to obtain the particular telephone information and the particular URL information from another computer that is different from the computer identified by the particular URL information.

12. A communication device, comprising:
a first communication system configured to communicate with a plurality of external telephone devices through a telephone line network;
a second communication system configured to communicate with a computer plurality of computers on a computer network;
a display device; and
a controller configured to execute processes comprising:
controlling the display device to display a first screen configured to receive a designation of a particular destination in accordance with an input operation;
obtaining particular telephone information identifying a telephone device associated with the particular destination and particular URL information linking to predetermined data associated with the particular destination from a storage device in response to receiving the designation of the particular destination,
wherein the storage device is configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information;
controlling the display device to display a second screen configured to receive an instruction whether the predetermined data associated with the particular destination is to be obtained in response to receiving the designation of the particular destination;
controlling the second communication system to obtain the data associated with the particular destination from a computer of the plurality of the computers on the computer network in response to receiving an instruction to obtain the predetermined data associated with the particular destination, the computer being identified by the particular URL information;
controlling the display device to automatically display a third screen, without receiving of an additional instruction to display the third screen, in response to initiating obtaining the predetermined data associated with the particular destination, the third screen configured to receive an instruction whether a telephone call is to be made to the telephone device associated with the particular destination; and
controlling the first communication system to call the telephone device associated with the particular destination using the particular telephone information in response to receiving an instruction to make the telephone call to the telephone device associated with the particular destination.

13. The communication device according to claim 12,
wherein the controller is further configured to obtain the particular telephone information, which is associated with address information of a site that obtains address information from a database that stores address information in the computer network and that associates the particular telephone information to an address associated with the address information.

14. The communication device according to claim 12, further comprising:
a data record device configured to record the predetermined data associated with the particular destination in a nonvolatile memory medium.

15. The communication device according to claim 12, further comprising:
an image output device configured to output images based on the predetermined data associated with the particular destination.

16. The communication device according to claim 15,
wherein the image output device is configured to print out images based on the predetermined data associated with the particular destination.

17. The communication device according to claim 13,
wherein the telephone device associated with the particular destination is disposed at a shop, the database storing the particular telephone information, which is at the shop, and the address information, which represents a site from which shop data is obtained.

18. The communication device according to claim 17,
wherein the address information, which represents the site from which the shop data is obtained, further comprises address information of a site from which coupon data representing a coupon associated with the shop is obtained.

19. The communication device according to claim 12, wherein the controller is configured to execute processes further comprising:
controlling the display device to display a fourth screen configured to receive another instruction whether a telephone call is to be made to the telephone device associated with the particular destination or the predetermined data associated with the particular destination is to be obtained in accordance with another input operation; and
controlling the second communication system to obtain the data associated with the particular destination from the computer of the plurality of the computers on the computer network in response to receiving another instruction to obtain the predetermined data associated with the particular destination.

20. The communication device according to claim 12, wherein the controller is configured to obtain the particular telephone information and the particular URL information from another computer that is different from the computer identified by the particular URL information.

21. A network communication system, comprising:
a server device, which is connected to a computer network, and which comprises a database configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information, the database associating the plurality of pieces of telephone information with the plurality of pieces of URL information; and
a communication device comprising:
a first communication system configured to communicate with a plurality of external telephone devices through a telephone line network;
a second communication system configured to communicate with a plurality of computers on the computer network;
a display device; and
a controller configured to execute processes comprising:
controlling the display device to display a first screen configured to receive a designation of a particular destination in accordance with an input operation;
obtaining particular telephone information identifying a telephone device associated with the particular destination and particular URL information linking to predetermined data associated with the particular destination from the server device in response to receiving the designation of the particular destination;
controlling the display device to display a second screen configured to receive an instruction indicating whether a telephone call is to be made to the telephone device associated with the particular destination in response to receiving the designation of the particular destination;
controlling the first communication system to call the telephone device associated with the particular destination using the particular telephone information in response to receiving an instruction to make the telephone call to the telephone device associated with the particular destination;
controlling the display device to automatically display a third screen, without receiving an additional instruction to display the third screen, in response to initiating the telephone call to the telephone device associated with the particular destination, the third screen configured to receive an instruction indicating whether the predetermined data associated with the particular destination is to be obtained; and
controlling the second communication system to obtain the predetermined data associated with the particular destination from a computer of the plurality of computers on the computer network in response to receiving an instruction to obtain the predetermined data associated with the particular destination, the computer being identified by the particular URL information.

22. The network communication system according to claim 21,
wherein the server device comprises a shop database storing the particular telephone information identifying the telephone device at a predetermined shop, the shop database obtaining address information representing a site from which shop data is obtained, and the shop database associating the particular telephone information identifying the telephone device at the predetermined shop with the address information representing the site from which the shop data is obtained.

23. The network communication system according to claim 22, further comprising:
another computer of the plurality of computers that is connected to the computer network and configured to store the shop data corresponding to the address information registered in the database.

24. A network communication system, comprising:
a server device, which is connected to a computer network, and which comprises a database configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information, the database associating the plurality of pieces of URL information with the plurality of pieces of telephone information; and
a communication device, comprising:
a first communication system configured to communicate with a plurality of external telephone devices through a telephone line network;
a second communication system configured to communicate with a plurality of computers on the computer network;
a display device; and
a controller configured to execute processes comprising:

controlling the display device to display a first screen configured to receive a designation of a particular destination in accordance with an input operation;

obtaining particular telephone information identifying a telephone device associated with the particular destination and particular URL information linking to predetermined data associated with the particular destination from the server device in response to receiving the designation of the particular destination;

controlling the display device to display a second screen configured to receive an instruction whether the predetermined data associated with the particular destination is to be obtained in response to receiving the designation of the particular destination;

controlling the second communication system to obtain the data associated with the particular destination from a computer of the plurality of the computers on the computer network in response to receiving an instruction to obtain the predetermined data associated with the particular destination, the computer being identified by the particular URL information;

controlling the display device to automatically display a third screen, without receiving an additional instruction to display the third screen, in response to initiating obtaining the predetermined data associated with the particular destination, the third screen configured to receive an instruction whether a telephone call is to be made to the telephone device associated with the particular destination; and controlling the first communication system to call the telephone device associated with the particular destination using the particular telephone information in response to receiving an instruction to make the telephone call to the telephone device associated with the particular destination.

25. The network communication system according to claim 24, wherein the server device comprises a shop database storing the particular telephone information identifying the telephone device at a predetermined shop, the shop database obtaining address information representing a site from which shop data is obtained, and the shop database associating the particular telephone information identifying the telephone device at the predetermined shop with the address information representing the site from which the shop data is obtained.

26. The network communication system according to claim 25, further comprising:

another computer of the plurality of computers that is connected to the computer network and stores the shop data corresponding to the address information registered in the database.

27. A non-transitory computer-readable medium comprising computer-readable instructions stored thereon that, when executed by a controller of a computer comprising a display device, a first communication system configured to communicate with a plurality of external telephone devices through a telephone line network, and a second communication system configured to communicate with a plurality of computers on a computer network, instruct the controller to execute processes comprising:

controlling the display device to display a first screen configured to receive a designation of a particular destination in accordance with an input operation;

obtaining particular telephone information identifying a telephone device associated with the particular destination and particular URL information linking to predetermined data associated with the particular destination from a storage device in response to receiving the designation of the particular destination, wherein the storage device is configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information;

controlling the display device to display a second screen configured to receive an instruction indicating whether a telephone call is to be made to the telephone device associated with the particular destination in response to receiving the designation of the particular destination;

controlling the first communication system to call the telephone device associated with the particular destination using the particular telephone information in response to receiving an instruction to make the telephone call to the telephone device associated with the particular destination;

controlling the display device to automatically display a third screen, without receiving an additional instruction to display the third screen, in response to initiating the telephone call to the telephone device associated with the particular destination, the third screen configured to receive an instruction indicating whether the predetermined data associated with the particular destination is to be obtained; and controlling the second communication system to obtain the predetermined data associated with the particular destination from another computer of the plurality of computers on the computer network in response to receiving an instruction to obtain the predetermined data associated with the particular destination, the other computer being identified by the particular URL information.

28. A non-transitory computer-readable medium comprising computer-readable instructions stored thereon that, when executed by a controller of a computer comprising a display device, a first communication system configured to communicate with a plurality of external telephone devices through a telephone line network, and a second communication system configured to communicate with a plurality of computers on a computer network, instruct the controller to execute process comprising:

controlling the display device to display a first screen configured to receive a designation of a particular destination in accordance with an input operation;

obtaining particular telephone information identifying a telephone device associated with the particular destination and particular URL information linking to predetermined data associated with the particular destination from a storage device in response to receiving the designation of the designated destination, wherein the storage device is configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information;

controlling the display device to display a second screen configured to receive an instruction whether the predetermined data associated with the particular destination is to be obtained in response to receiving the designation of the particular destination;

controlling the second communication system to obtain the data associated with the particular destination from another computer of the plurality of the computers on the computer network in response to receiving an instruction to obtain the predetermined data associated with the particular destination, the other computer being identified by the particular URL information;

controlling the display device to automatically display a third screen, without receiving an additional instruction to display the third screen, in response to initiating obtaining the predetermined data associated with the particular destination, the third screen configured to receive an instruction whether a telephone call is to be made to the telephone device associated with the particular destination; and controlling the first communication system to call the telephone device associated with the particular destination using the particular telephone information in response to receiving an instruction to make the telephone call to the telephone device associated with the particular destination.

29. A communication device, comprising:
a first communication system configured to communication with a plurality of external telephone devices through a telephone line network;
a second communication system configured to communicate with a computer on a computer network;
a display device; and
a controller configured to execute processes comprising:
controlling the display device to display a first screen configured to receive a designation of a particular destination in accordance with an input operation;
obtaining particular telephone information identifying a telephone device associated with the particular destination and particular URL information linking to predetermined data associated with the particular destination from a storage device in response to receiving the designation of the particular destination;
wherein the storage device is configured to store a plurality of destination information identifying a plurality of destinations, a plurality of pieces of telephone information associated with respective telephone devices identified by the plurality of destination information, and a plurality of pieces of URL information linking to predetermined data associated with respective destinations identified by the plurality of destination information; and
controlling the display device to display a second screen in response to receiving the designation of the particular destination, the second screen configured to receive an instruction whether a telephone call is to be made to the telephone device associated with the particular destination or the predetermined data associated with the particular destination is to be obtained in response to the designation of the particular destination, wherein, in response to receiving an instruction to make the telephone call is to the telephone device associated with the particular destination, the controller is configured to execute processes further comprising:
controlling the first communication system to call the telephone device associated with the particular destination using the particular telephone information;
controlling the display device to automatically display a third screen, without receiving an additional instruction to display the third screen, in response to initiating the telephone call to the telephone device associated with the particular destination, the third screen configured to receive an instruction indicating whether the predetermined data associated with the particular destination is to be obtained; and
controlling the second communication system to obtain the predetermined data associated with the particular destination from a computer of the plurality of computers on the computer network in response to receiving an instruction to obtain the predetermined data associated with the particular destination, the computer being identified by the particular URL information, and wherein, in response to receiving an instruction to obtain the predetermined data associated with the particular destination, the controller is configured to execute processes further comprising:
controlling the second communication system to obtain the data associated with the particular destination from the computer of the plurality of the computers on the computer network in response to receiving an instruction to obtain the predetermined data associated with the particular destination, the computer being identified by the particular URL information;
controlling the display device to automatically display a fourth screen, without receiving an additional instruction to display the fourth screen, in response to initiating obtaining the predetermined data associated with the particular destination, the third screen configured to receive an instruction whether a telephone call is to be made to the telephone device associated with the particular destination; and
controlling the first communication system to call the telephone device associated with the particular destination using the particular telephone information in response to receiving an instruction to make the telephone call to the telephone device associated with the particular destination.

30. The communication device according to claim 29, wherein the controller is configured to obtain the particular telephone information and the particular URL information from another computer that is different from the computer identified by the particular URL information.

* * * * *